(12) United States Patent
Shiraishi

(10) Patent No.: US 9,001,392 B2
(45) Date of Patent: *Apr. 7, 2015

(54) IMAGING ELEMENT ARRAY AND IMAGE FORMING APPARATUS

(71) Applicant: Toshiba Tec Kabushiki Kaisha, Tokyo (JP)

(72) Inventor: Takashi Shiraishi, Kanagawa (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/162,594

(22) Filed: Jan. 23, 2014

(65) Prior Publication Data

US 2014/0204430 A1 Jul. 24, 2014

(30) Foreign Application Priority Data

Jan. 23, 2013 (JP) ................................ 2013-010090

(51) Int. Cl.
*H04N 1/04* (2006.01)
*H04N 1/024* (2006.01)
*H04N 1/00* (2006.01)
*H04N 1/028* (2006.01)

(52) U.S. Cl.
CPC ........... *H04N 1/024* (2013.01); *H04N 1/00278* (2013.01); *H04N 1/028* (2013.01)

(58) Field of Classification Search
CPC ... H04N 1/024; H04N 1/028; H04N 1/00278; H04N 5/2252; H04N 1/02815; H04N 1/02895; H04N 5/33; H04N 13/007; H04N 13/044; H04N 13/0459; H04N 1/00525

USPC ......... 358/474, 475, 509, 486, 501; 382/275, 382/167

See application file for complete search history.

(56) References Cited

U.S. PATENT DOCUMENTS

| 6,485,153 | B2 * | 11/2002 | Ota ................................ 359/859 |
| 6,661,540 | B1 * | 12/2003 | Hasegawa et al. ............ 358/474 |
| 6,724,503 | B1 * | 4/2004 | Sako et al. .................... 358/483 |
| 7,060,959 | B2 * | 6/2006 | Chen .......................... 250/208.1 |
| 7,152,795 | B2 * | 12/2006 | Tsikos et al. ............. 235/462.01 |
| 7,375,900 | B2 * | 5/2008 | Yagyu et al. .................. 359/680 |
| 7,410,264 | B2 * | 8/2008 | Yamasaki et al. ............... 353/94 |
| 7,443,550 | B2 * | 10/2008 | Huang et al. .................. 358/475 |
| 7,538,912 | B2 * | 5/2009 | Sawada ......................... 358/483 |
| 8,780,416 | B2 * | 7/2014 | Inoue et al. ................... 358/474 |

FOREIGN PATENT DOCUMENTS

JP 2002-062407 A 2/2002

* cited by examiner

*Primary Examiner* — Negussie Worku
(74) *Attorney, Agent, or Firm* — Patterson & Sheridan, LLP

(57) ABSTRACT

An imaging element array includes a plurality of imaging elements that are arranged side by side. Each imaging element is integrally molded as a single piece element and includes an incident surface, an emission surface, and a plurality of reflective surfaces which are provided between the incident surface and the emission surface. The imaging element includes a first reflective element and propagation preventing surfaces. The first reflective element includes at least one of the plurality of reflective surfaces and has an effective region which is in contact with adjacent imaging elements. The propagation preventing surfaces are to either side of another one of the plurality of reflective surfaces and are positioned to prevent light rays other than light rays reflected from the reflective surface from propagating to the emission surface.

20 Claims, 31 Drawing Sheets

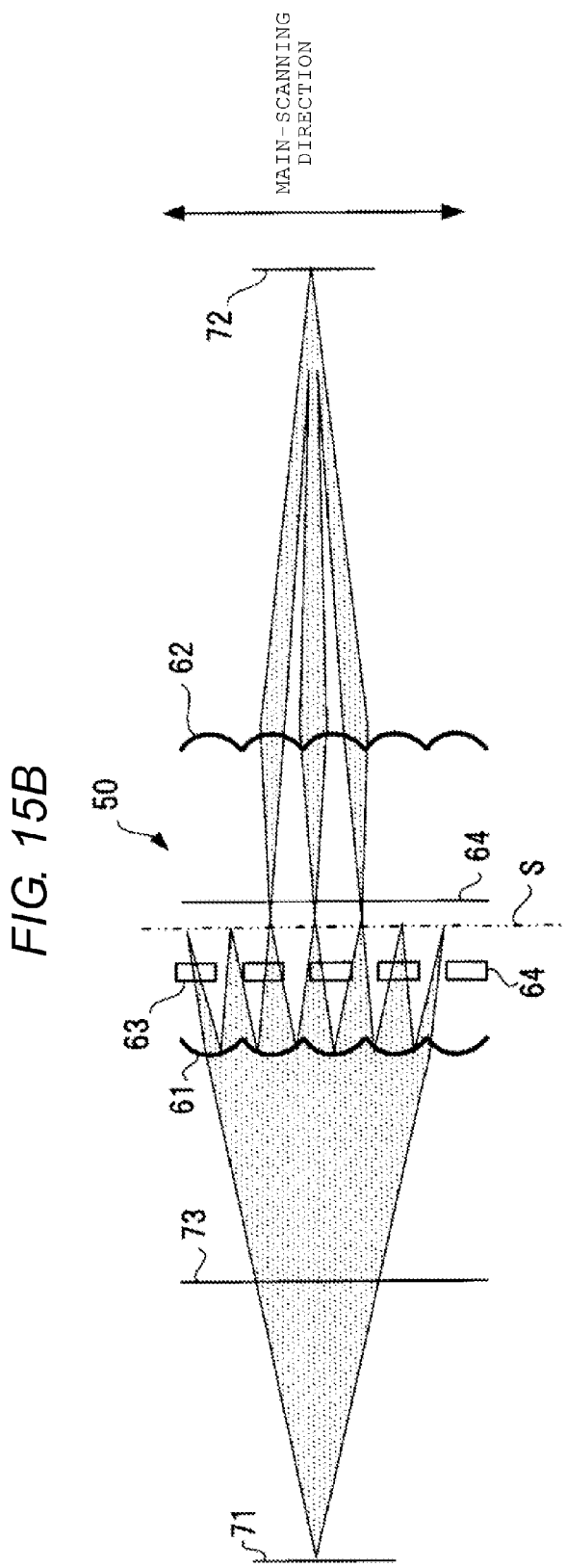

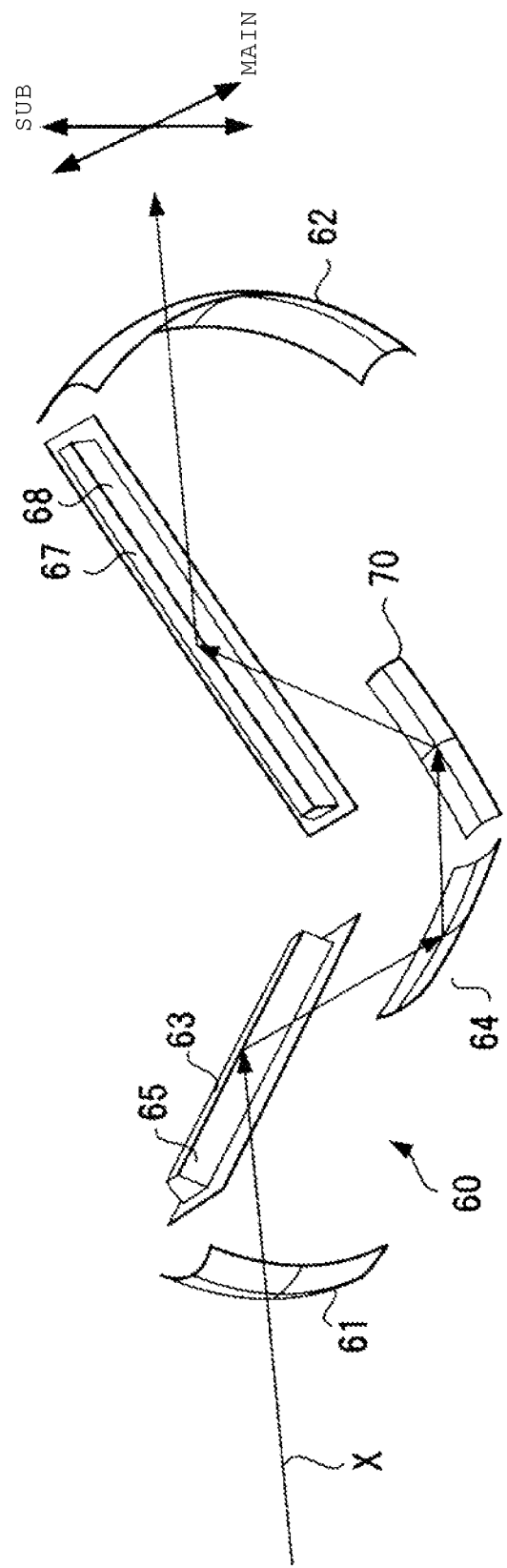

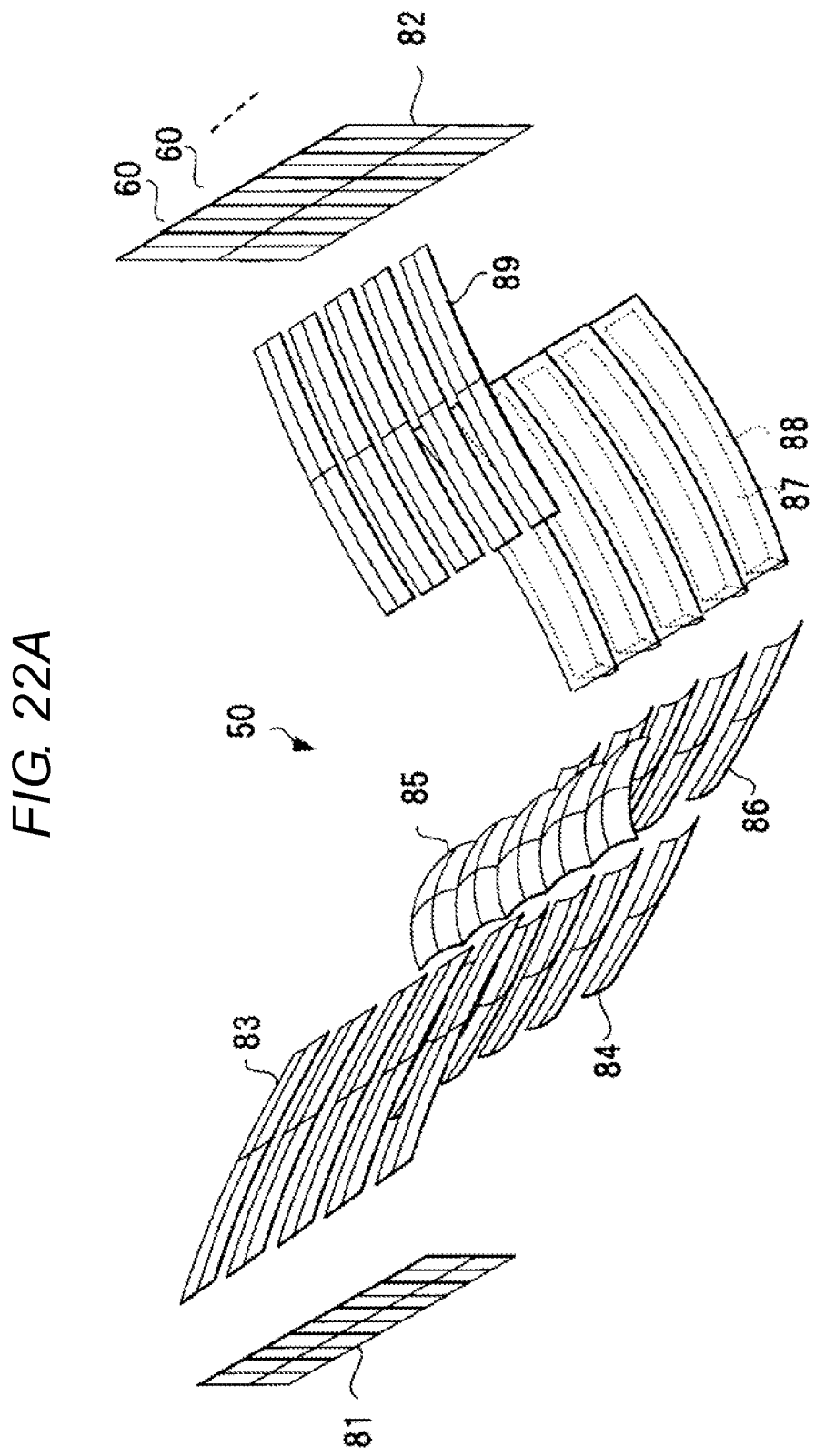

IMAGING ELEMENT ARRAY AND IMAGE FORMING APPARATUS

CROSS-REFERENCE TO RELATED APPLICATION

This application is based upon and claims the benefit of priority from Japanese Patent Application No. 2013-010090, filed Jan. 23, 2013, the entire contents of which are incorporated herein by reference.

FIELD

Embodiments described herein relate generally to an imaging element array configured with lenses and mirrors; and an image forming apparatus using the imaging element array.

BACKGROUND

In the related art, in an image forming apparatus such as a scanner, a copying machine, or a multi-function peripheral (MFP), an image of a document is formed on an image sensor by imaging the document using an illumination device and a lens array in which plural lenses are arranged to direct the image of the document to the image sensor. In addition, in an image forming apparatus such as a printer, a copying machine, or a multi-function peripheral (MFP), by using a light emitting element such as an LED and a lens array, light rays emitted from the LED are imaged on a photoconductor drum through the lens array, and the image is formed (exposed) on the photoconductor drum. The lens array is formed, for example, by combining plural lenses and apertures.

However, in such a lens array, when optical axes deviate from each other between lenses through which one light ray passes, imaging characteristics greatly deteriorate and non-uniformity in light intensity at the focal plane becomes severe. In addition, when plural lenses and apertures are combined, a deviation during assembly causes deterioration in performance.

JP-A-2002-62407 discloses an imaging element array in which imaging elements are combined to avoid deterioration in performance caused by a misalignment of multiple lenses during assembly of an imaging apparatus. However, since there are two reflective surfaces at a position where a light flux width is wide, the positional accuracy of the reflective surfaces effects image formation. Therefore, there is a problem in that it is necessary to increase the time needed to mold the lens in a molding operation.

DESCRIPTION OF THE DRAWINGS

FIGS. 15A and 15B are diagrams illustrating paths of light rays of an imaging element array according to the one embodiment when seen from a main-scanning direction and a sub-scanning direction.

FIGS. 21A and 21B are diagrams illustrating a configuration of a modification example of the imaging element array according to the third embodiment.

FIGS. 22A and 22B are diagrams illustrating an imaging element array according to a fourth embodiment.

DETAILED DESCRIPTION

Figure 1:
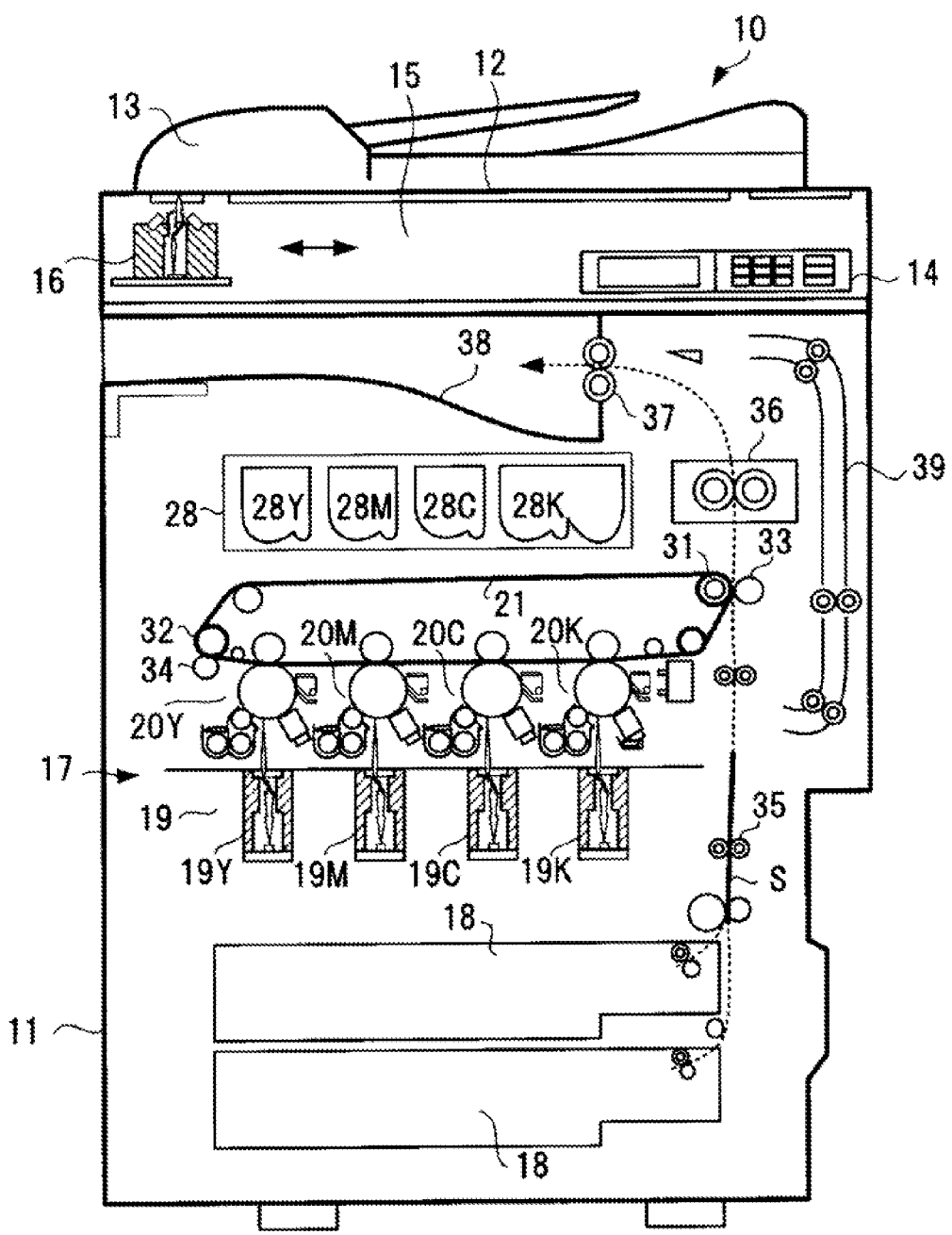
FIG. 1 is a diagram illustrating a configuration of an image forming apparatus according to one embodiment.

According to the present exemplary embodiments, it is possible to provide an imaging element array that can suppress a deviation in relative position between a lens and a mirror and can be molded as one molded product and to provide an image forming apparatus using the imaging element array.

In general, according to one embodiment, there is provided an imaging element array including a plurality of imaging elements that are arranged side by side. Each imaging element is integrally molded as a single piece element and includes an incident surface, an emission surface, and a plurality of reflective surfaces which are provided between the incident surface and the emission surface. The imaging element includes a first reflective element and propagation preventing surfaces. The first reflective element includes at least one of the plurality of reflective surfaces and has an effective region which is in contact with adjacent imaging elements. The propagation preventing surfaces are to either side of another one of the plurality of reflective surfaces and are positioned to prevent light rays other than light rays reflected from the reflective surface from propagating to the emission surface.

Hereinafter, the embodiments will be described with reference to the drawings. In each drawing, the same component will be represented by the same reference numeral.

(First Embodiment)

FIG. 1 is a diagram illustrating a configuration of an image forming apparatus using an imaging element array according to one embodiment. In FIG. 1, an image forming apparatus 10 is, for example, a multi-function peripheral (MFP), a printer, or a copying machine. In the following description, an MFP will be described as an example.

A document plate 12 made of transparent glass is provided above a main body 11 of the MFP 10, and an automatic document feeder (ADF) 13 is openably provided on the document plate 12. In addition, an operation panel 14 is provided above the main body 11. The operation panel 14 includes various keys and a touch panel type display unit.

A scanner unit 15 which is a reading device is provided below the ADF 13 in the main body 11. The scanner unit 15 reads a document fed by the ADF 13 or a document placed on the document plate 12 to generate image data, and includes a contact image sensor 16 (hereinafter, simply referred to as "image sensor"). The image sensor 16 is arranged to extend in a main-scanning direction, i.e., across the glass of document plate 12 (depth direction in FIG. 1).

When reading an image of a document placed on the document plate 12, the image sensor 16 reads the document image while moving below the document plate 12 across the document to be imaged. This operation is performed for the entire document size to read a document corresponding to one page. In addition, when reading an image of a document fed by the ADF 13, the image sensor 16 is positioned at a fixed position (position illustrated in the drawing), and the document with the image facing the image sensor is moved there past.

Further, a printer unit 17 is provided at the center of the main body 11, and plural cassettes 18 for accommodating various sizes of sheets are provided in a lower portion of the main body 11. The printer unit 17 includes a photoconductor drum and an optical scanning device for exposing an image the photoconductor drum for transfer to paper or other print media. The optical scanning unit includes a scanning head 19 including an LED as a light emitting element and scans a photoreceptor with light rays emitted from the scanning head 19 to form an image.

The printer unit 17 processes image data read by the scanner unit 15 or image data created by a personal computer (PC) or the like to form an image on a sheet which is a recording medium. The printer unit 17 is, for example, a tandem type color laser printer and includes image forming units 20Y, 20M, 20C, and 20K of various colors including yellow (Y), magenta (M), cyan (C), and black (K).

The image forming units 20Y, 20M, 20C, and 20K are arranged below an intermediate transfer belt 21 in parallel in a direction from an upstream side to a downstream side. In addition, the scanning head 19 includes plural scanning heads 19Y, 19M, 19C, and 19K corresponding to the image forming units 20Y, 20M, 20C, and 20K.

Figure 2:
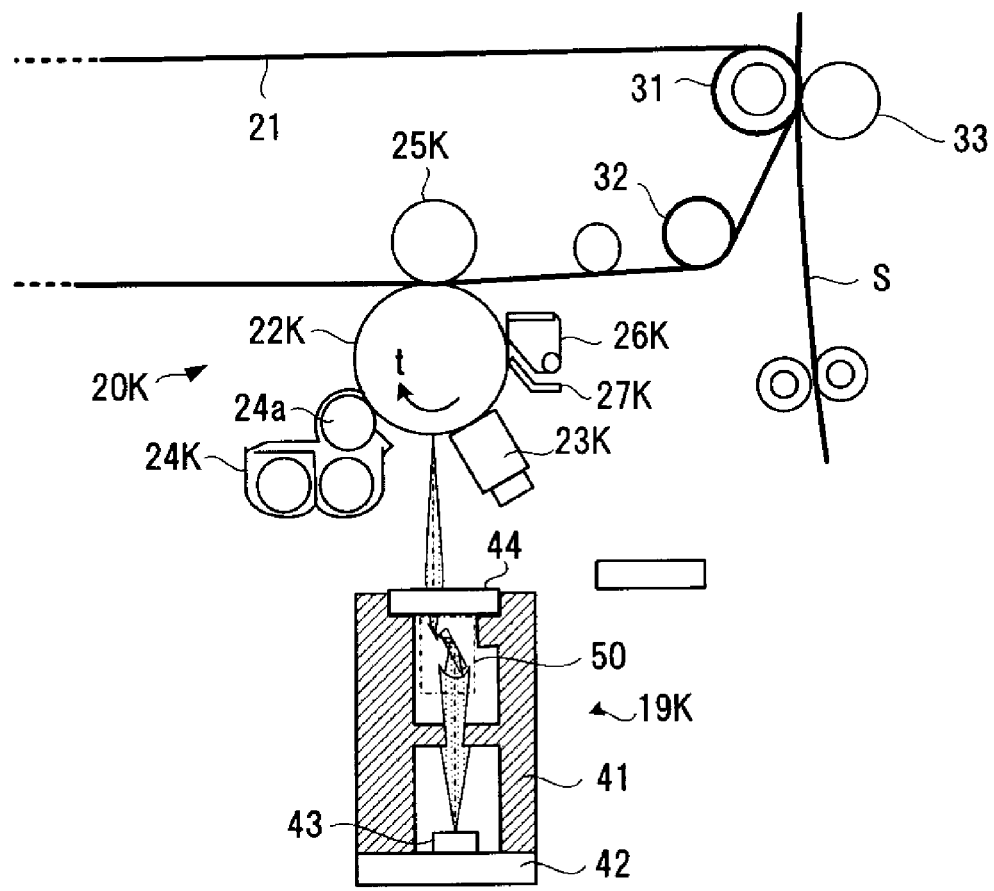
FIG. 2 is an enlarged diagram illustrating a configuration of an image forming unit according to the one embodiment.

FIG. 2 is an enlarged diagram illustrating the image forming unit 20K among the image forming units 20Y, 20M, 20C, and 20K. In the following description, the image forming unit 20K will be representatively described because the image forming units 20Y, 20M, 20C, and 20K have the same configuration as image forming unit 20K.

As illustrated in FIG. 2, the image forming unit 20K includes a photoconductor drum 22K on which an image may be written. In the vicinity of the photoconductor drum 22K, an electric charger 23K, a developing unit 24K, a primary transfer roller 25K, a cleaner 26K, a blade 27K, and the like are arranged along a rotation direction t. An exposure position of the photoconductor drum 22K is irradiated with light from the scanning head 19K, and an electrostatic latent image is thus formed on the photoconductor drum 22K.

The electric charger 23K of the image forming unit 20K uniformly charges a surface of the photoconductor drum 22K as that surface moves past the charger 23K. The developing unit 24K supplies a two-component developer including a black toner and a carrier to the photoconductor drum 22K to form a toner image on the photoconductor drum 22K using a developing roller 24a to which a developing bias is applied. The cleaner 26K removes toner, remaining on the surface of photoconductor drum 22K, using the blade 27K.

In addition, as illustrated in FIG. 1, a toner cartridge section 28 for supplying toners to developing units 24Y to 24K is provided above the image forming units 20Y to 20K. The toner cartridge 28 section includes toner cartridges (28Y to 28K) of various colors including yellow (Y), magenta (M), cyan (C), and black (K).

The intermediate transfer belt 21 is suspended by a driving roller 31 and a driven roller 32 and moves in a cycle. In addition, the intermediate transfer belt 21 is engaged in contact with the photoconductor drums 22Y to 22K. As illustrated in FIG. 2, the primary transfer roller 25K applies a primary transfer voltage to a position of the intermediate transfer belt 21 opposite to the photoconductor drum 22K so as to first transfer a toner image, formed on the photoconductor drum 22K, onto the intermediate transfer belt 21.

The driving roller 31 for moving the intermediate transfer belt 21 is arranged opposite to a secondary transfer roller 33. When a sheet S passes through a gap between the driving roller 31 and the secondary transfer roller 33, the secondary transfer roller 33 applies a secondary transfer voltage to the sheet S. The toner image on the intermediate transfer belt 21 is then transferred onto the sheet S of media such as paper. A belt cleaner 34 is provided in the vicinity of the driven roller 32 of the intermediate transfer belt 21.

In addition, as illustrated in FIG. 1, a carrying roller 35 for carrying the sheet S fed from the sheet feeding cassette 18 is provided between the sheet feeding cassette 18 and the secondary transfer roller 33. Further, a fixing unit 36 is provided on the downstream side of the secondary transfer roller 33. In addition, a carrying roller 37 is provided on the downstream side of the fixing unit 36. The carrying roller 37 discharges the sheet S to a discharging unit 38. Further, a reversing and carrying path 39 is provided on the downstream side of the fixing unit 36. The reversing and carrying path 39 reverses the sheet S to be guided to a direction of the secondary transfer roller 33 and is used for duplex printing.

Next, a configuration of the scanning head 19K of the optical scanning device will be described with reference to FIG. 2. The scanning head 19K is provided opposite to the photoconductor drum 22K to expose the photoconductor drum 22K. The photoconductor drum 22K is rotated at a preset rotating speed such that charges can be accumulated on a surface thereof. The photoconductor drum 22K is irradiated and exposed with light from the scanning head 19K to form an electrostatic latent image on the surface of the photoconductor drum 22K.

The scanning head 19K includes an imaging element array 50, and the imaging element array 50 is supported by a holding member 41. In addition, a support 42 is provided on the bottom of the holding member 41. LED elements 43 which are light emitting elements are arranged in the support 42. The LED elements 43 are linearly provided in the main-scanning (into the paper of FIG. 3) direction at regular intervals. In addition, a substrate (not illustrated) that includes a driver IC for controlling emission of the LED elements 43 is provided in the support 42. A specific configuration of the imaging element array 50 will be described below.

The driver IC configures a controller and generates a control signal of the scanning head 19K based on image data read by the scanner unit 15 or image data created by PC or the like, and the LED elements emit light rays having a predetermined light intensity in accordance with the control signal. The light rays emitted from the LED elements 43 enter to the imaging element array 50, pass through the imaging element array 50, are imaged on the photoconductor drum 22K, and forms an image on the photoconductor drum 22K. In addition, an upper portion (emission side) of the scanning head 19K is covered with a cover glass 44.

Figure 3:
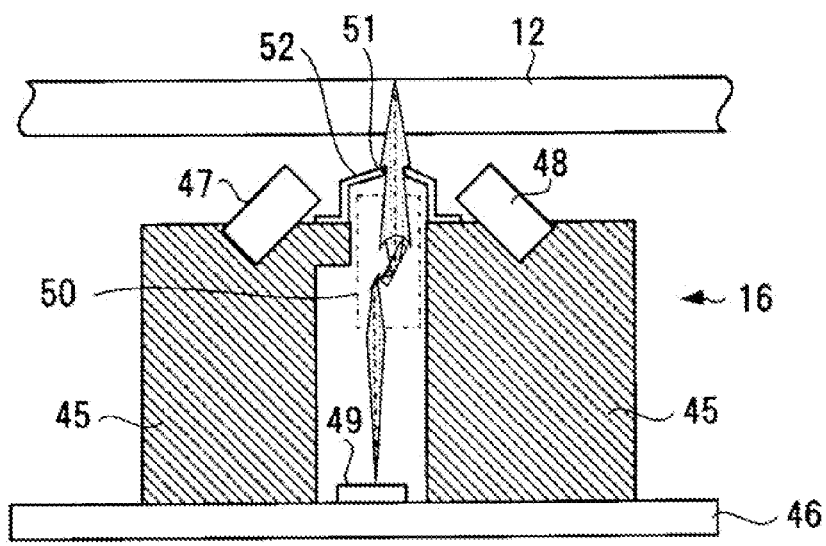
FIG. 3 is an enlarged diagram illustrating a configuration of an image reading device according to the one embodiment.

FIG. 3 is a diagram illustrating a configuration of the image sensor 16 of the scanner unit 15 (reading device). The image sensor 16 reads an image of a document placed on the document plate 12 or an image of a document fed by the ADF 13 in accordance with an operation of the operation panel 14. The image sensor 16 is a one-dimensional sensor which is arranged in the main-scanning direction and includes a case 45.

The case 45 is arranged on the substrate 46. On an upper side of the case 45 which is the side of the document plate 12, two LED line illumination devices 47 and 48 for emitting light in a document direction are provided so as to extend in the main-scanning direction (depth direction in the drawing). The LED line illumination devices 47 and 48 include an LED and a light guiding body. The light source is not limited to an LED and may be a fluorescent tube, a xenon tube, a cold-cathode tube, an organic EL, or the like.

The imaging element array 50 is supported between the LED line illumination devices 47 and 48 which are positioned above the case 45. On the substrate 46 which is positioned on the bottom of the case 45, a sensor 49 configured with CCD, CMOS, or the like is mounted. In addition, a light shielding body 52 including a slit 51 is attached above the case 45.

The LED line illumination devices 47 and 48 irradiate an image reading position of a document on the document plate 12 with light, and light rays reflected from the image reading position enter to the imaging element array 50 through the slit 51. The imaging element array 50 functions as an erect equal-magnification lens. The light rays incident to the imaging element array 50 are emitted from an emission surface of the imaging element array 50 and form an image on the sensor 49. That is, among the light rays irradiated from the illumination devices 47 and 48, light rays reflected from a document pass through the imaging element array 50. The light rays which form the image are converted into electric signals by the sensor 49, and the electric signals are transferred to a memory unit (not illustrated) of the substrate 46.

Figure 4:
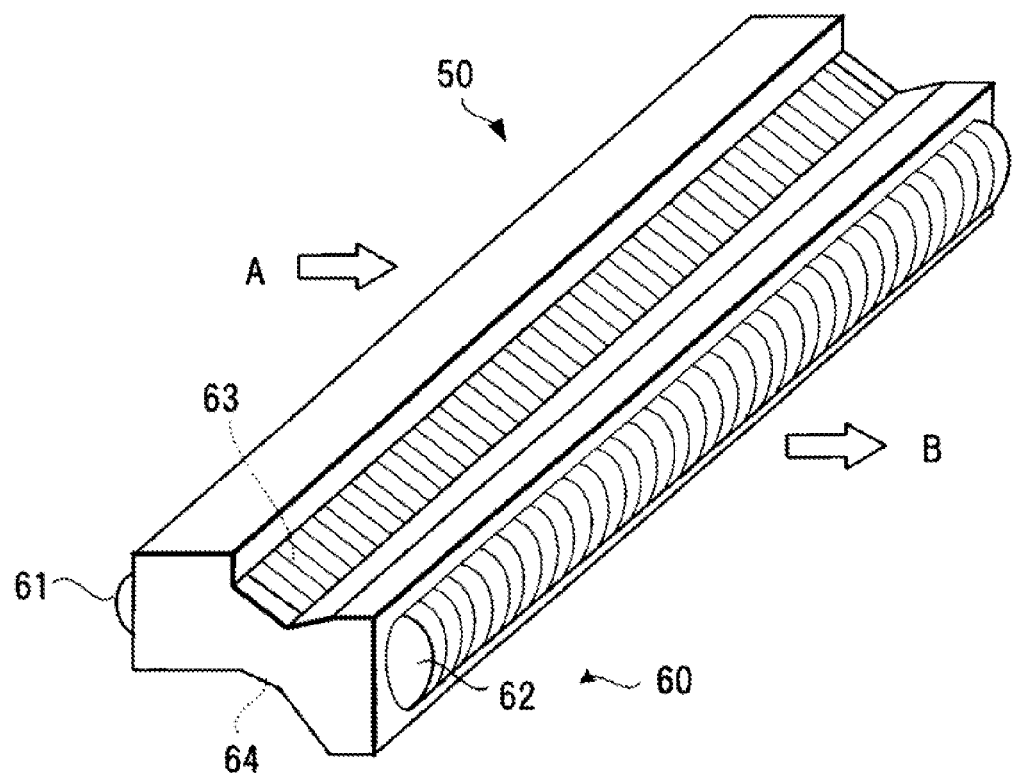
FIG. 4 is a perspective view illustrating an imaging element array according to the one embodiment.

Hereinafter, the configuration of the imaging element array 50 will be described in detail. FIG. 4 is a perspective view illustrating the imaging element array 50 according to the first embodiment. An incident direction of light is indicated by arrow A, and an emission direction of light is indicated by arrow B.

The imaging element array 50 includes plural imaging elements 60, and each imaging element 60 includes a lens surface 61 which is an incident surface, a lens surface 62 which is an emission surface, and reflective surfaces 63 and 64 from which light rays entering from the lens surface 61 are reflected multiple times (twice in an example of FIG. 4) to the emission lens surface 62. Hereinafter, the reflective surface will be referred to as "mirror surface".

As illustrated in FIG. 4, the imaging element array 50 which is configured with the plural imaging elements 60 (imaging element group) is obtained by arranging the plural imaging elements 60 in the main-scanning direction such that the incident surfaces and the emission surfaces thereof are adjacent to each other extending in the main scanning direction, respectively. In addition, the plural imaging elements 60 are integrally formed of a resin or a glass. In the following description, the imaging element array 50 will also be simply referred to as "array 50".

In FIG. 4, the lens surface 61 is an a lens surface (incident surface) which is asymmetric in a direction perpendicular to the main-scanning direction, and the lens surface 62 is a lens surface (emission surface) which is asymmetric in a direction perpendicular to the main-scanning direction. Hereinafter, the lens surface 61 and the lens surface 62 will also be referred to as "incident lens surface" and "emission lens surface", respectively.

Figure 5:
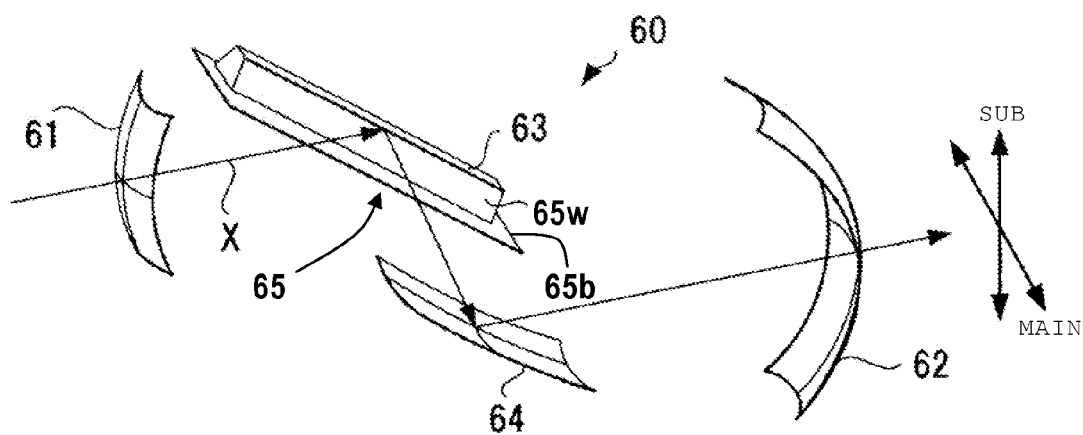
FIG. 5 is a perspective view illustrating a configuration of an imaging element according to the one embodiment.

FIG. 5 is a perspective view schematically illustrating a configuration of one set of the imaging element 60. The imaging element 60 includes the incident lens surface 61, the mirror surfaces 63 and 64, and the emission lens surface 62. In FIG. 5, the lens surface 61, the mirror surfaces 63 and 64, and the lens surface 62 are separately illustrated, but this illustration is for easy understanding of the configuration of each imaging element 60. Actually, these components are integrally molded into a single element using a glass or a resin. Incident light rays X (in FIG. 5, only a central light ray of an optical path is illustrated) enter to the lens surface 61.

In addition, as illustrated in FIG. 5, in the mirror surface 63, a reflective surface is formed on the top of a convex portion 65 which outwardly protrudes from a base 65b when seen from the incident direction of light. In addition, the convex portion 65 includes opposed walls 65w which taper inwardly in the height direction (direction extending from the body of the imaging element) of the convex portion 65.

Figure 6:
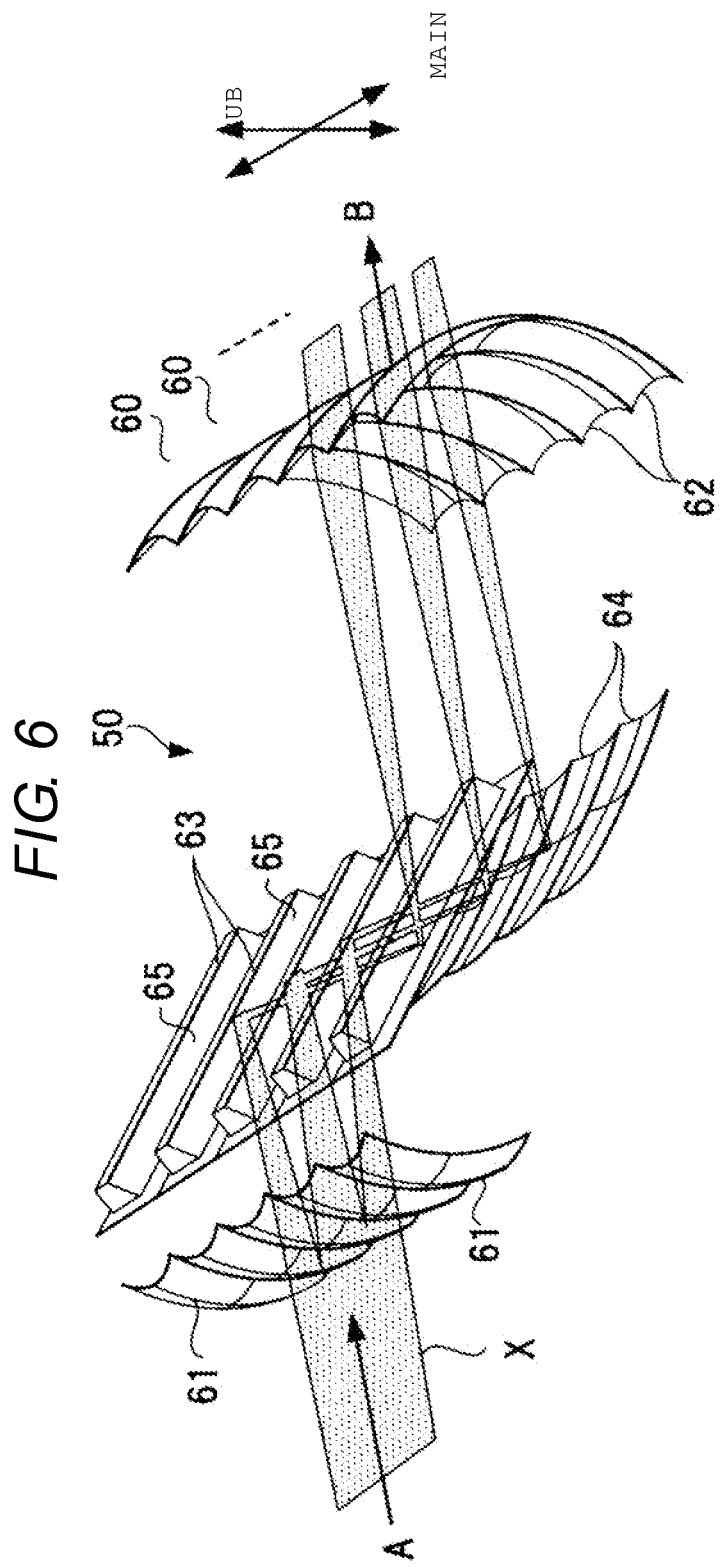
FIG. 6 is a perspective view illustrating paths of light rays of an imaging element array according to the one embodiment.

FIG. 6 is a perspective view illustrating a state where the plural sets of the imaging elements 60 are arranged side by side. Moreover, paths of light rays are illustrated, and light rays collected in one set contribute to image formation. When light rays incident to the incident lens surface 61 of one of the imaging elements 60 enter into another of the imaging elements 60 and reach an image plane, these light rays are called stray light rays. The stray light rays deteriorate imaging performance. In FIGS. 5 and 6, the main-scanning direction and the sub-scanning direction are indicated by arrows "main" and "sub", respectively. In the following drawings, an arrow denoted by "main" and an arrow denoted by "sub" will indicate the main-scanning direction and the sub-scanning direction, respectively.

The light rays X incident to the imaging element array 50 enter to the lens surface 61, which is asymmetric in a direction perpendicular to the main-scanning direction, and are collected in both the main-scanning direction and the sub-scanning direction. Among the light rays, light rays contributing to image formation enter to, and reflect from, the mirror surface 63. The mirror surface 63 is formed on the top of the convex portion 65 which outwardly protrudes from the body of each imaging element 60. The light rays incident on the mirror surface 63 are reflected, and light rays contributing to image formation among the reflected light rays impinge the mirror surface 64, which is asymmetric in a direction perpendicular to the main-scanning direction, at an incident angle satisfying total reflection conditions in the vicinity of a plane where an inverted image is formed.

The light rays incident on the mirror surface 64 are reflected from the mirror surface 64, are guided to the emission lens surface 62 (light ray emission surface) which is asymmetric in a direction perpendicular to the main-scanning direction, are imaged again by the lens surface 62, and form an erect equal-magnification image of the image received at lens surface 62 on an image plane. The image plane corresponds to the sensor 49 or the photoconductor drum 22.

As can be seen from FIGS. 5 and 6, in the array 50, the mirror surfaces 63, which sequentially reflect incident light rays to be guided to the lens surface 62, and specific other portions are alternately arranged in the main-scanning direction, the specific other portions are configured to guide light rays incident thereon to portions of the imaging element 60 or array 50 other than the next mirror surface, to portions of the imaging element 60 or array 50 that do not finally guide the light rays to the image plane, to light shielding (blocking) portions of the of the imaging element 60 or array 50, or to portions of the imaging element 60 or array 50 that absorb the incident light rays.

That is, surfaces (propagation preventing surfaces) for preventing light rays other than the light rays reflected from the mirror surfaces 63 and 64 from propagating to the lens surface 62 are provided to both sides of the mirror surface 63. In FIGS. 5 and 6, the convex portion sidewalls 65 on both sides of the mirror surface 63 function as the propagation preventing surfaces.

Figure 7:
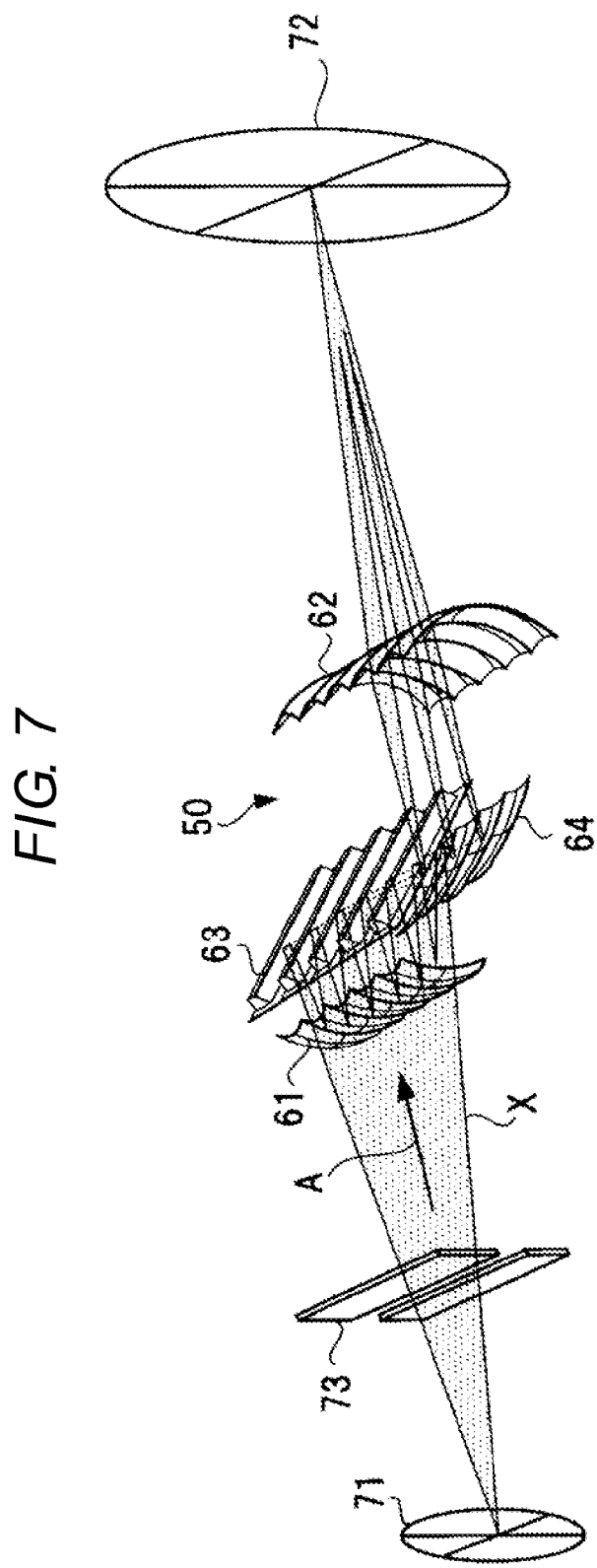
FIG. 7 is a perspective view illustrating paths of light rays from an object plane to an image plane of an imaging element array according to the one embodiment.

FIG. 7 is a diagram illustrating paths of the light rays X of the imaging element array 50 which is provided between an object plane 71 and an image plane 72. A slit 73 for preventing stray light rays from reaching the array 50 is provided between the object plane 71 and the array 50. Light rays entering from the object plane 71 (LED 43 or a light reflected off of a document placed on the document placement surface of the document plate 12) are collected through the slit 73, pass through the lens surfaces 61 of the array 50, are reflected from the mirror surfaces 63 and 64, are emitted from the lens surfaces 62, and then travel to form an image on the image plane 72 (the photoconductor drum 22 or the sensor 49).

FIGS. 8A to 11D are diagrams illustrating states where light rays propagate on the respective lens surfaces and the respective mirror surfaces. In FIGS. 8A to 11D, arrow A indicates a propagation direction of the light rays X.

Figure 8A:
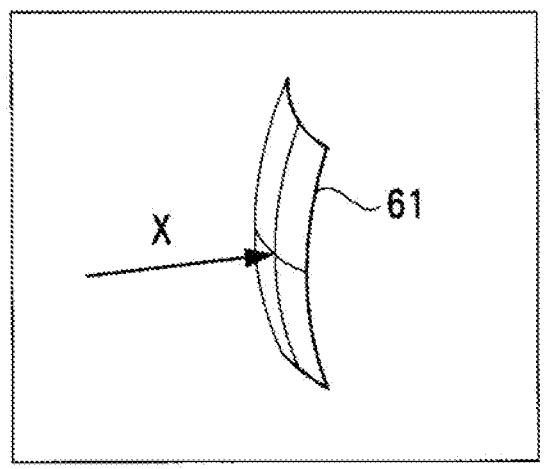
FIGS. 8A to 8D are diagrams illustrating a state where light rays propagate on a lens surface 61 according to the one embodiment.
Figure 8B:
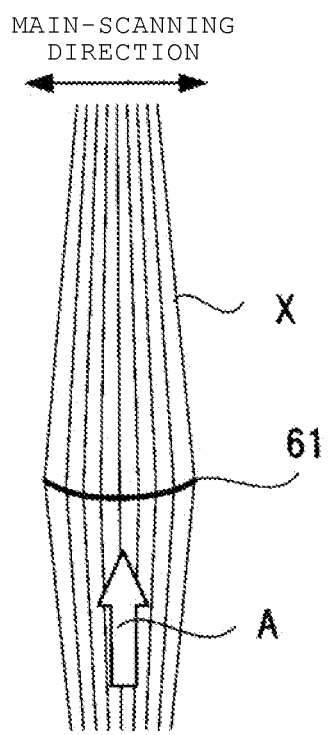
Figure 8C:
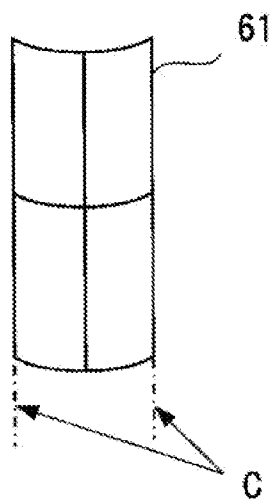
Figure 8D:
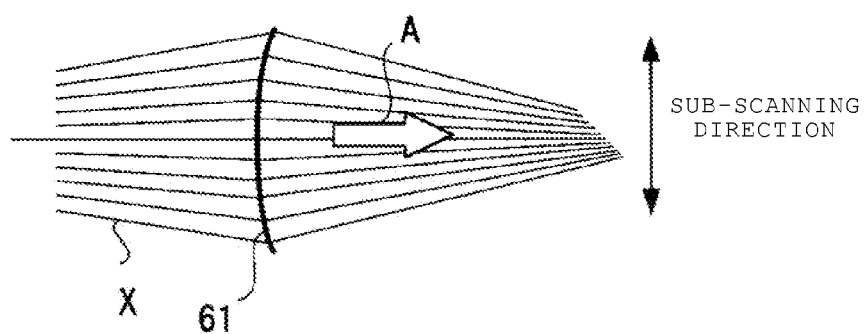

FIG. 8A is a diagram illustrating an incident direction of the light rays X to the lens surface 61. FIG. 8B is a diagram illustrating the lens surface 61 when seen from the sub-scanning direction, FIG. 8C is a diagram illustrating the lens surface 61 when seen from the incident direction of the light rays X, and FIG. 8D is a diagram illustrating the lens surface 61 when seen from the main-scanning direction. The lens surface 61 configures a lens surface (incident surface) which is asymmetric in a direction perpendicular to the main-scanning direction. Broken dot-dash lines C of FIG. 8C indicate boundaries with adjacent imaging elements, and the boundaries form edges of the lens. Accordingly, incident light rays to be shielded are minimized to increase an optical efficiency.

As illustrated in FIGS. 8B and 8D, the light rays X are collected in both the main-scanning direction (in the direction across the lens between reference lines C-C), and the sub-scanning direction (in the direction of the reference lines C), light rays emitted from an object point at a predetermined object height are collected into one set of imaging elements 60, and thus the intensity of light rays contributing to image formation is increased. In addition, a shape of the lens surface 61 is asymmetric in a direction perpendicular to the main-scanning direction. As a result, various aberrations caused by light rays being obliquely incident to a mirror surface which is arranged on the downstream side of optical paths can be eliminated.

Figure 9A:
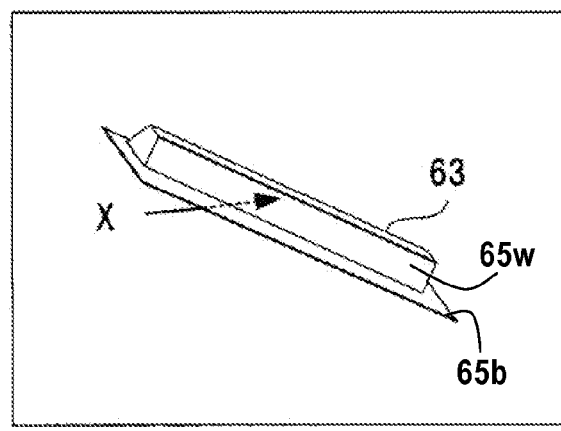
FIGS. 9A to 9D are diagrams illustrating a state where light rays propagate on a mirror surface 63 according to the one embodiment.
Figure 9B:
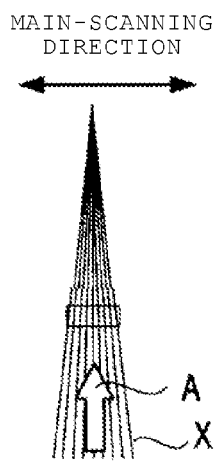
Figure 9C:
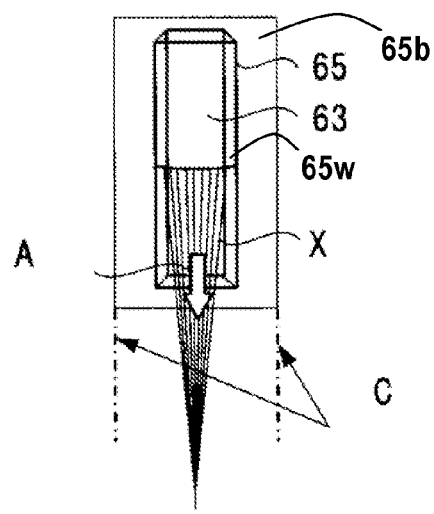
Figure 9D:
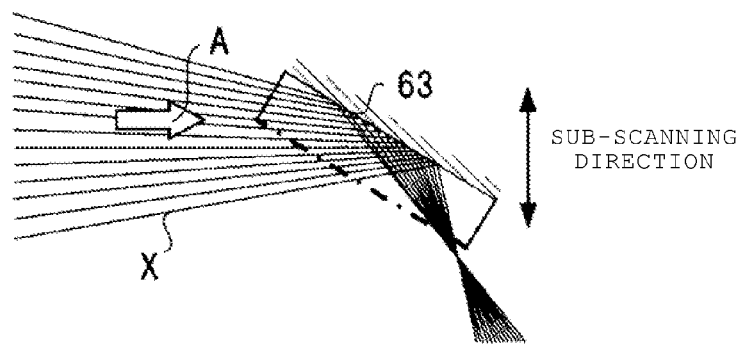

FIG. 9A is a diagram illustrating an incident direction of the light rays X to the mirror surface 63. FIG. 9B is a diagram illustrating the mirror surface 63 when seen from the sub-scanning direction, FIG. 9C is a diagram illustrating the mirror surface 63 when seen from the incident direction of the light rays, and FIG. 9D is a diagram illustrating the mirror surface 63 when seen from the main-scanning direction.

The mirror surface 63 guides light rays to the next mirror surface 64. In addition, the mirror surface 63 is formed on the top of the convex portion 65 which outwardly protrudes from the body of the imaging element 60. Light rays which form a predetermined angle, or greater, with respect to the main scanning direction are shielded by the wall surfaces 65 of the convex portion. In addition, lines C of FIG. 9C indicate boundary surfaces with adjacent imaging elements 60, and regions of the imaging element 60 between the mirror surface 63 and the boundary surfaces C function as the above-described propagation preventing surfaces. Light rays incident to these regions are finally guided to light shielding portions, guided to portions other than an image plane such as a sensor surface or the photoconductor drum, or are absorbed.

Figure 10A:
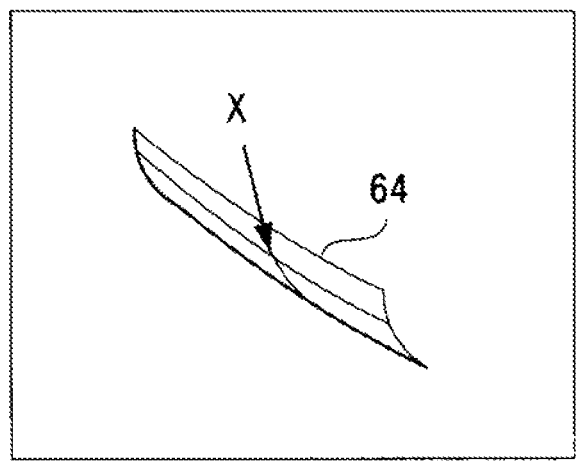
FIGS. 10A to 10D are diagrams illustrating a state where light rays propagate on a mirror surface 64 according to the one embodiment.
Figure 10B:
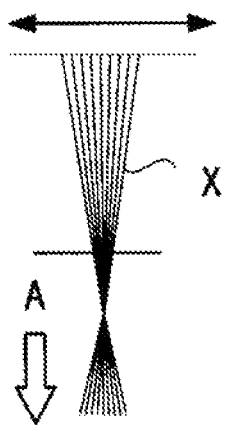
Figure 10C:
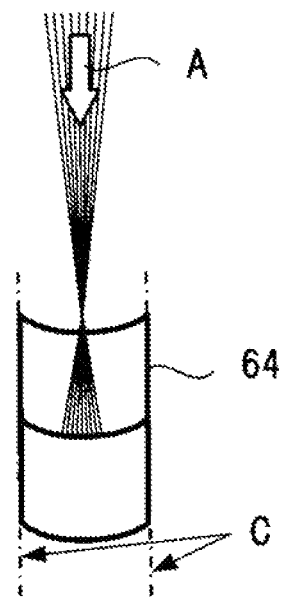

FIG. 10A is a diagram illustrating an incident direction of the light rays X to the mirror surface 64. FIG. 10B is a diagram illustrating the mirror surface 64 when viewed from the sub-scanning direction, FIG. 10C is a diagram illustrating the mirror surface 64 when viewed from the incident direction of the light rays, and FIG. 10D is a diagram illustrating the mirror surface 64 when viewed from the main-scanning direction.

The mirror surface 64 which is asymmetric in a direction perpendicular to the main-scanning direction guides light rays to the next mirror surface in the same imaging element 60. Lines C of FIG. 10C indicate boundary surfaces (mirror edges) with mirror surfaces 64 of adjacent imaging elements 60, and the adjacent mirror surfaces 64 are in contact with each other. As a result, incident light rays to be shielded are minimized to increase an optical efficiency.

Figure 10D:
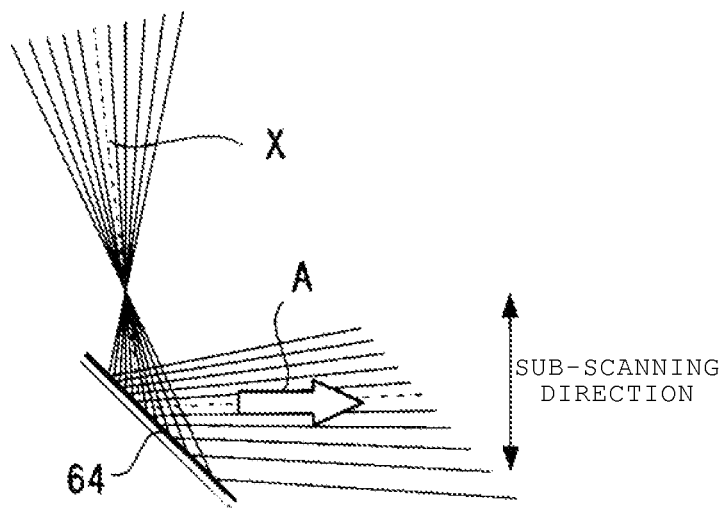

In addition, as illustrated in FIG. 10D, an intermediate inverted image plane is formed in the vicinity of the mirror surface 64. As a result, a direction in which light rays propagate to the main-scanning direction can be made to pass through the emission side lens surface 62 while suppressing various aberrations having an angled curvature.

As can be seen from FIG. 10D, immediately before light rays enter to the mirror surface 64, positions of an optical path direction where the mirror surface acts on the light rays are different from each other on the left and right sides of the light rays (left to right along the mirror surface 64). On the left side, the mirror surface acts on the light rays on an upstream side of an optical path which is closer to an intermediate image plane where an inverted image is formed. On the right side, the mirror surface acts on the light rays on a downstream side of an optical path which is further from an intermediate image plane where an inverted image is formed.

In order to minimize a deviation in light collecting position between the left and right sides of the light rays (between the upper and lower sides after the light rays are reflected from the mirror surface 64), an absolute value of power of the mirror 64 at the left hand side portion of FIG. 10D is set to be relatively greater, and an absolute value of power of the mirror 64 at the right hand side portion of FIG. 10D is set to be less than the above absolute value. Therefore, this mirror surface 64 has a shape which is asymmetric in a direction perpendicular to the main-scanning direction. That is, the mirror surface 64 has a power capable of reflecting the inverted image which enters thereinto and allowing the vicinity of the incident surface and the vicinity of the emission surface to have a conjugate relationship with each other.

Figure 11A:
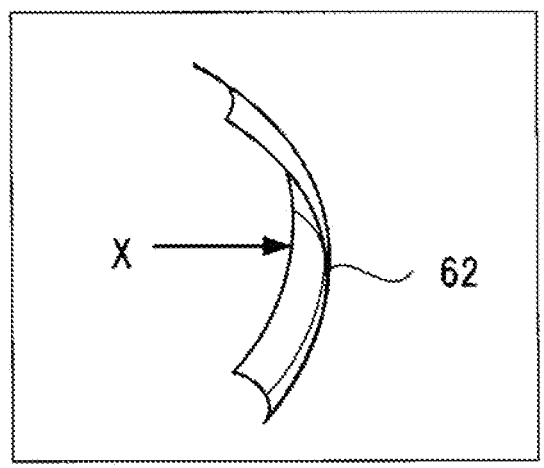
FIGS. 11A to 11D are diagrams illustrating a state where light rays propagate on a lens surface 62 according to the one embodiment.
Figure 11B:
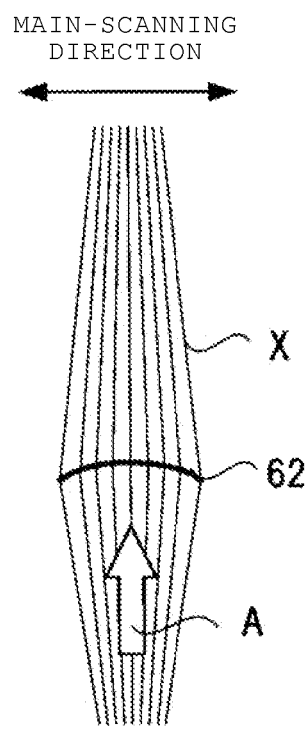

FIG. 11A is a diagram illustrating an incident direction of the light rays X to the emission lens surface 62. FIG. 11B is a diagram illustrating the emission lens surface 62 when viewed from the sub-scanning direction, FIG. 11C is a diagram illustrating the emission lens surface 62 when viewed from the incident direction of the light rays X, and FIG. 11D is a diagram illustrating the emission lens surface 62 when viewed from the main-scanning direction.

Figure 11C:
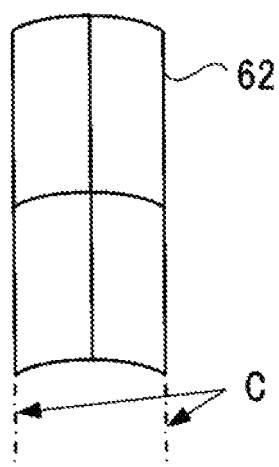
Figure 11D:
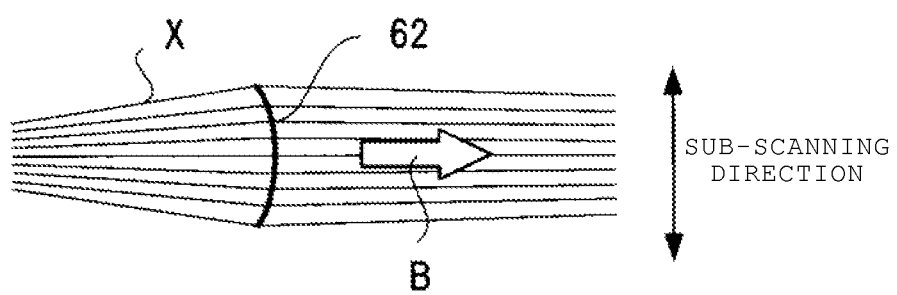

Lines C of FIG. 11C indicate boundary surfaces of emission lens surfaces 62 of adjacent imaging elements 60. In the emission lens surface 62, the boundaries with adjacent imaging elements form edges of the lens. As illustrated in FIGS. 11B and 11D, the light rays are collected in both the main-scanning direction and the sub-scanning direction and form an image on an image plane such as the sensor 49 or the photoconductor drum 22. A shape of the lens surface 62 is asymmetric in a direction perpendicular to the main-scanning direction. As a result, various aberrations caused by light rays obliquely entering to a mirror surface of the previous stage can be eliminated.

Figure 12:
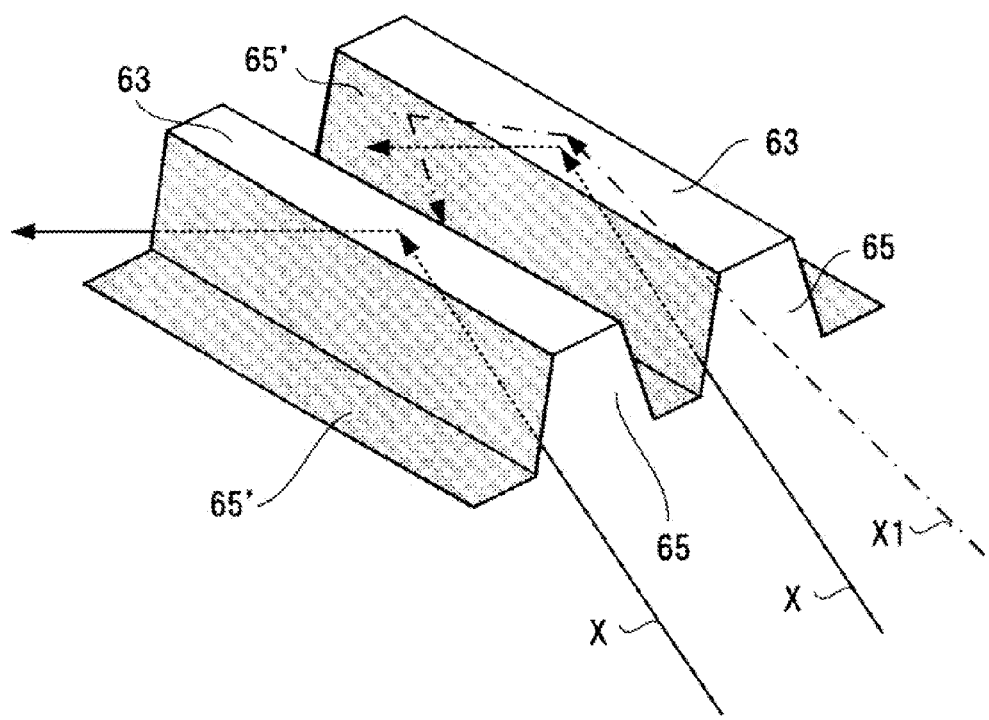
FIG. 12 is an enlarged perspective view illustrating the mirror surface 63 according to the one embodiment.

Next, the action of walls of the convex portion 65 in the mirror surface 63 will be described. FIG. 12 is an enlarged perspective view illustrating the mirror surface 63, and FIG. 13 is a cross-sectional view illustrating the mirror surface 63.

The mirror surface 63 is formed on the top of the convex portion at the upper terminus of the side walls 65. The light rays X enter to the mirror surface 63 and are reflected from the mirror surface 63 to be emitted therefrom. Meanwhile, the wall surfaces 65 of the convex portion have an action of shielding light rays having an absolute value of a main-scanning direction angle θ. In FIG. 12, all the light rays X (solid lines) having a predetermined incident angle with respect to the main-scanning direction are reflected from the mirror surface 63 and propagate toward the next optical surface (lens surface 64). On the other hand, a light ray X1 (dot-dash line) having an absolute value of an incident angle θ with respect to the main-scanning direction propagates toward the convex portion 65, collides with and is reflected from a wall surface of the convex portion 65, and is finally guided to a region outside of an image plane (the sensor 49 or the photoconductor drum 22), or is absorbed within the imaging element 60.

Figure 13:
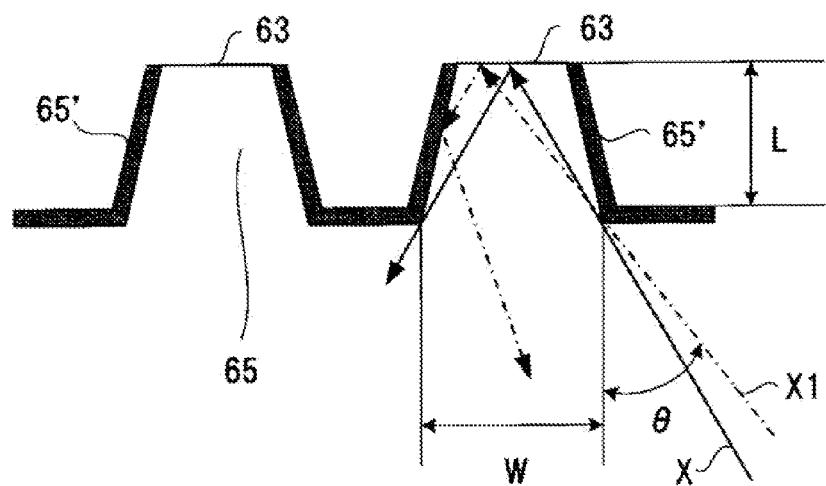
FIG. 13 is a cross-sectional view illustrating the mirror surface 63 according to the one embodiment.

As illustrated in FIG. 13, when a width of an entrance leading to the mirror surface 63 in the main-scanning direction is denoted by W and a distance from the entrance to the mirror surface 63 is denoted by L, the maximum absolute value of the incident angle θ with respect to the main-scanning direction is determined according to the following expression.

$$\tan|\theta| \le W/2/L$$

Accordingly, stray light rays can be prevented from propagating to an image plane by determining a shape of the wall surfaces of the convex portion 65 based on the above-described expression. In addition, it is preferable that a light shielding film 65' be formed on the wall surfaces 65 of the convex portion and a wall surface adjacent thereto. In order to form the light shielding film, for example, a light shielding ink 65' is coated. By coating the walls 65w and base 65b of the imaging element 60 between the walls 65w with a light shielding ink 65', light rays which reach the wall surfaces of the convex portion 65 can be absorbed.

Figure 14A:
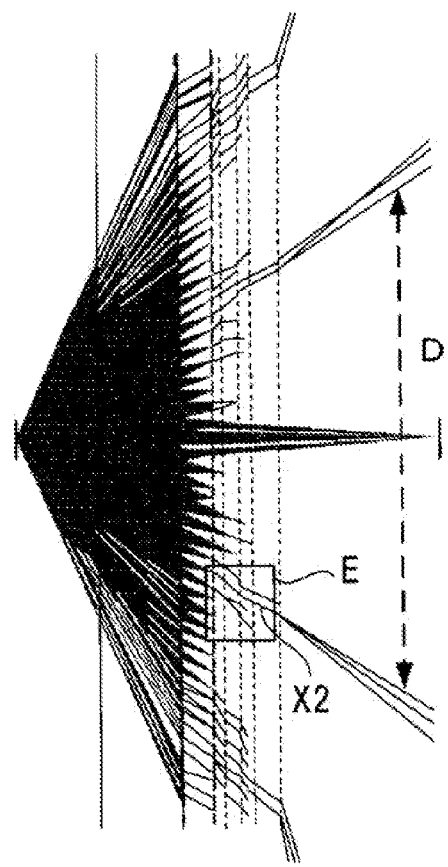
FIGS. 14A to 14C are diagrams illustrating different occurrence states of stray light rays depending on whether or not there is a convex portion of the mirror surface 63.
Figure 14B:
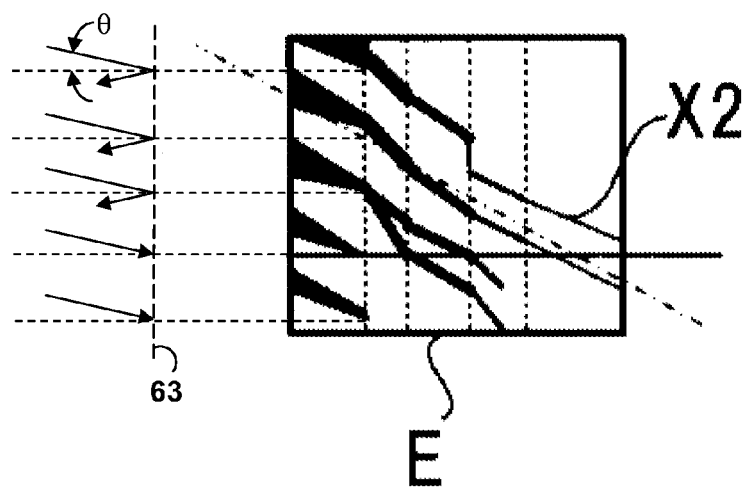
Figure 14C:
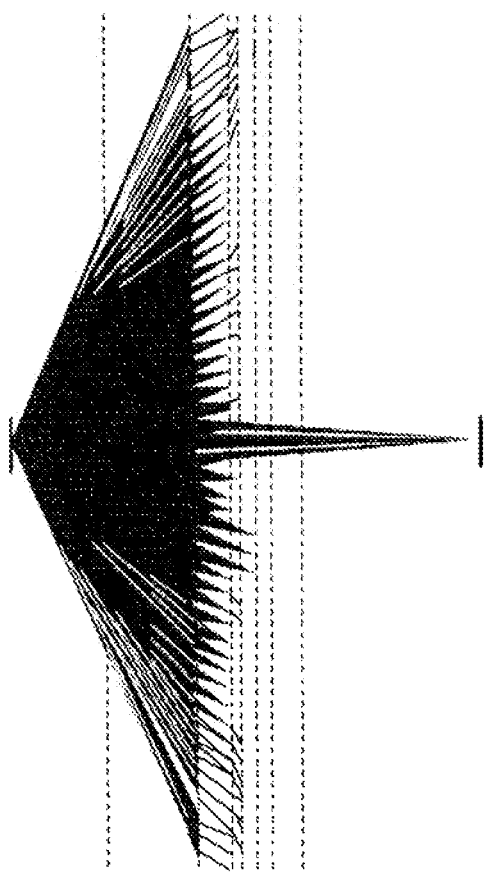

FIGS. 14A to 14C are diagrams illustrating different occurrence states of stray light rays with and without the convex portion and side walls 65 on or in the imaging element 60. FIG. 14A is a diagram illustrating light rays emitted from the mirror surface 63 when there is no. In FIG. 14A, light rays incident to the mirror surface 63 are reflected from the mirror surface 63 and become image forming light rays (light rays used for image formation). Among these image forming light rays, stray light rays in a certain range (range indicated by arrow D) can be removed, but stray light rays in a wide range cannot be removed.

FIG. 14B is an enlarged diagram illustrating the stray light portion within "box" E of FIG. 14A which is outside of the range of rays indicated by arrow D. The left half of FIG. 14B shows a reflective surface and reflected light seen from a direction parallel to the reflective surface of the mirror surface 63 and the vertical direction to main scanning direction. It can be seen that, for a stray light ray X2 which is out of the range passing within the range of angles spanned by double sided arrow D, the absolute value θ' of an angle of light rays entering to or emitted from each mirror surface with respect to the main-scanning direction is greater than that of the light rays used for image formation. That is, if the convex portion 65 were provided, and light rays having a greater absolute value of an angle with respect to the main scanning direction than that of the light rays used for image formation can be shielded or eliminated on at least one of the optical paths, stray light rays can be eliminated in the entire region.

FIG. 14C is a diagram illustrating a state of light rays emitted from the mirror surface 63 when the convex portion with the reflecting or absorbing sidewalls 65 is provided. As can be seen from FIG. 14C, stray light rays outside of the range of the double sided arrow D can be eliminated by providing the convex portion with the walls 65.

Figure 15A:
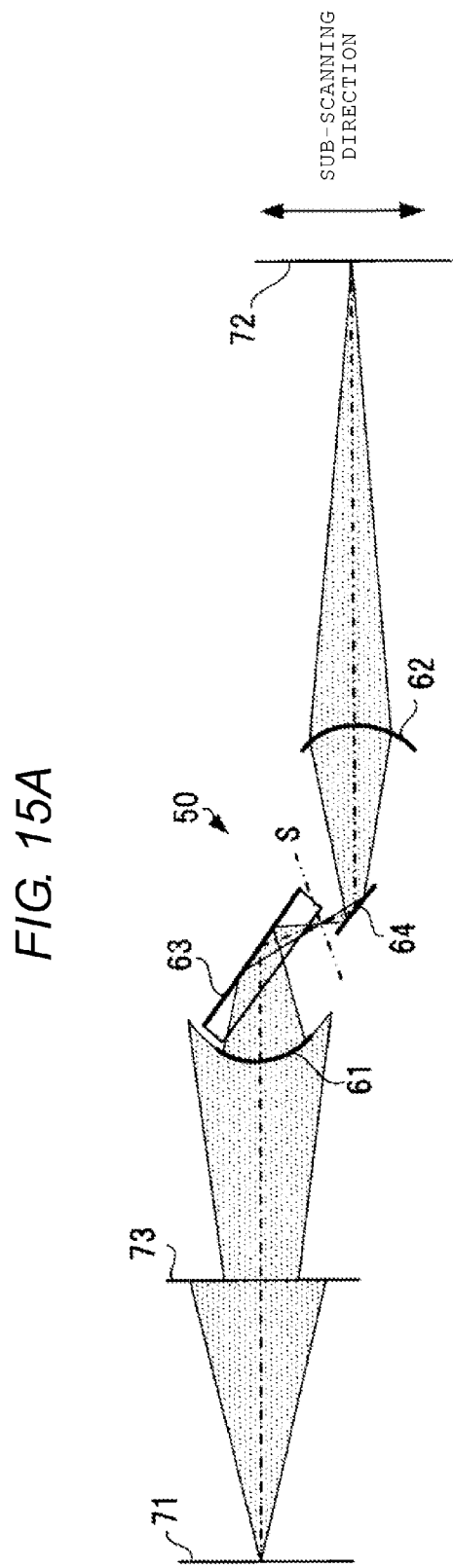

FIG. 15A is a diagram illustrating optical paths of the array 50 when seen from the main-scanning direction, and FIG. 15B is a diagram illustrating optical paths of the array 50 when seen from the sub-scanning direction. As can be seen from FIG. 15A, regarding the main-scanning direction, a light flux emitted from the object plane 71 enters to the lens surface 61 through the slit 73 and forms a inverted image in the vicinity of an intermediate portion (S) of the array 50. By inverting the inverted image again, an erect image is formed on the image plane 72. In addition, as can be seen from FIG. 15B, regarding the sub-scanning direction, light rays which pass through plural sets of the imaging elements 60 are collected to one point on the image plane 72.

In the above-described first embodiment, the mirror surface 63 having the convex portion with opposed walls 65 is provided immediately after the incident lens surface 61. As a result, since the angle of light rays, which pass through only the incident lens surface 61, with respect to the main-scanning direction is monotonously increased by increasing a distance of the main-scanning direction from an object point, a shape of a component for dealing with all the stray light rays can be simplified and a shape of a mold for making the imaging element 60 can be simplified. The increase in angle is a function of the spread of light emitted from a point source. The further from a light source, the wider the distance over which the light is visible.

In addition, since unnecessary and unwanted light rays are shielded on the upstream side of optical paths, the shape of a light shielding component which is provided between the mirrors on the downstream side can be simplified. However, if stray light rays reach the downstream side of the mirror surface 63, it is hard to shield all the stray light rays having a large angle. Therefore, it is necessary that edges of the mirror surface 64 be formed not in a jagged shape but in a sharp shape.

Next, an imaging element array according to a modification example of the first embodiment will be described with reference to FIGS. 16A and 16B. The imaging element array 50 according to the modification example reflects light rays entering from an incident lens surface 61 plural times (twice) to be guided to an emission lens surface 62 and is obtained by interchanging the positions of the mirror surface 63 and the mirror surface 64 of the first embodiment.

Figure 16A:
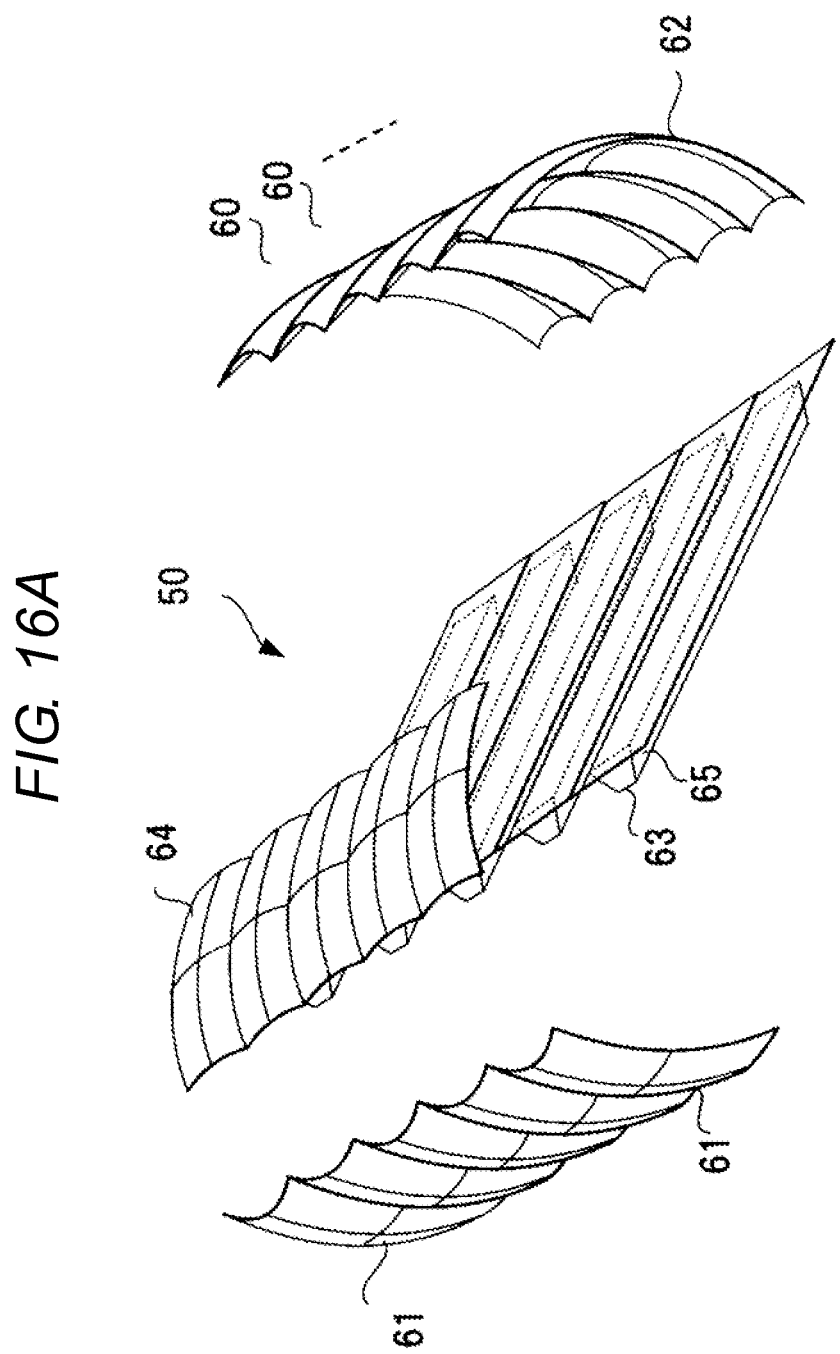
FIGS. 16A and 16B are diagrams illustrating a configuration of a modification example of an imaging element array according to a first embodiment.

FIG. 16A is a diagram illustrating a configuration of the imaging element array 50. The imaging element array 50 includes plural imaging elements 60, and each imaging element 60 includes the lens surface 61 which is an incident surface, the lens surface 62 which is an emission surface, and mirror surfaces 64 and 63 from which light rays entering from the lens surface 61 are reflected twice to the emission lens surface 62. FIG. 16B is a diagram illustrating one imaging element 60.

Figure 16B:
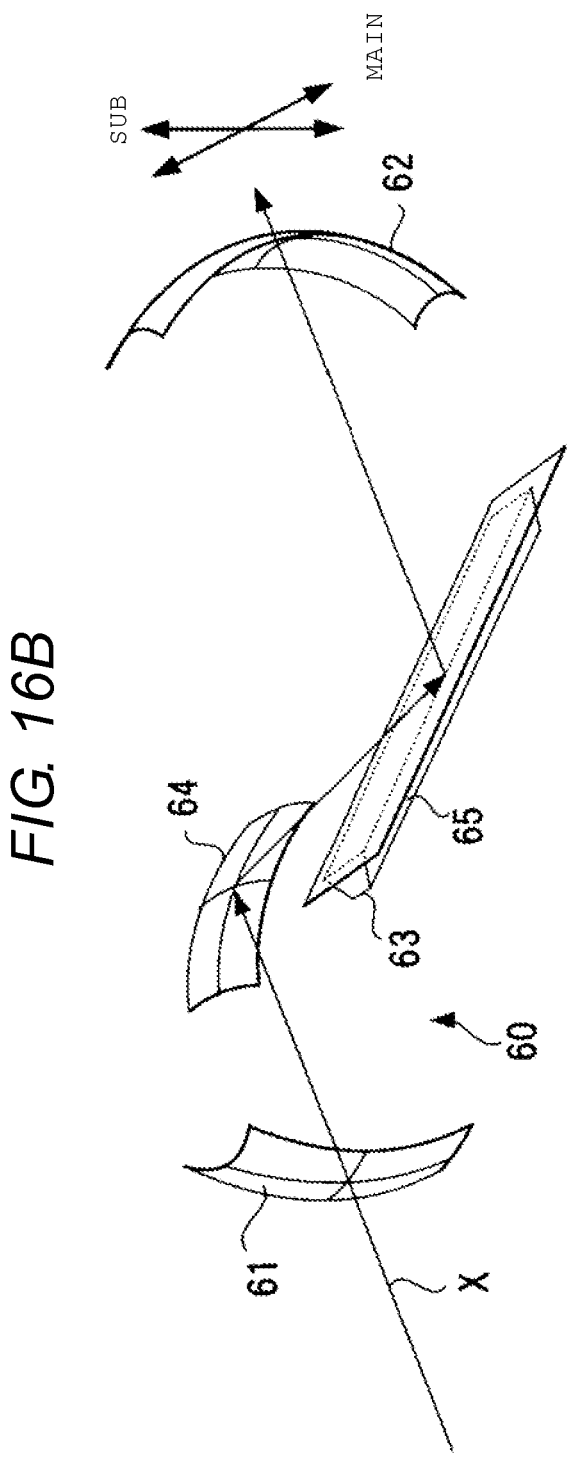

In FIGS. 16A and 16B, a planar mirror surface 63 having a convex portion with side walls 65, which outwardly protrudes from the imaging element, is allocated immediately before the emission lens surface 62. The light rays X incident to the imaging element array 50 enter the lens surface 61 (incident surface) and are collected in both the main-scanning direction and the sub-scanning direction. Among the light rays, light rays contributing to image formation reach the mirror surface 64 having an effective region which is in contact with those of adjacent imaging elements 60. All the light rays incident to the mirror surface 64 are reflected, and light rays contributing to image formation among the reflected light rays reach to the mirror surface 63. Further, all the light rays incident to the mirror surface 63 are reflected, and light rays contributing to image formation among the reflected light rays are guided to the lens surface 62 (emission surface), are imaged again by the lens surface 62, and form an erect equal-magnification image on an image plane. That portion of the rays reaching the reflected surface at an incident angle greater than θ (FIG. 13) will then be reflected off, or absorbed at, side wall 65, and will not contribute to the resulting printed image.

(Second Embodiment)

Next, an imaging element array according to a second embodiment will be described. The imaging element array 50 according to the second embodiment reflects light rays entering from an incident lens surface 61 multiple times (three times) to be guided to an emission lens surface 62, by addition of an additional mirror surface 66.

Figure 17A:
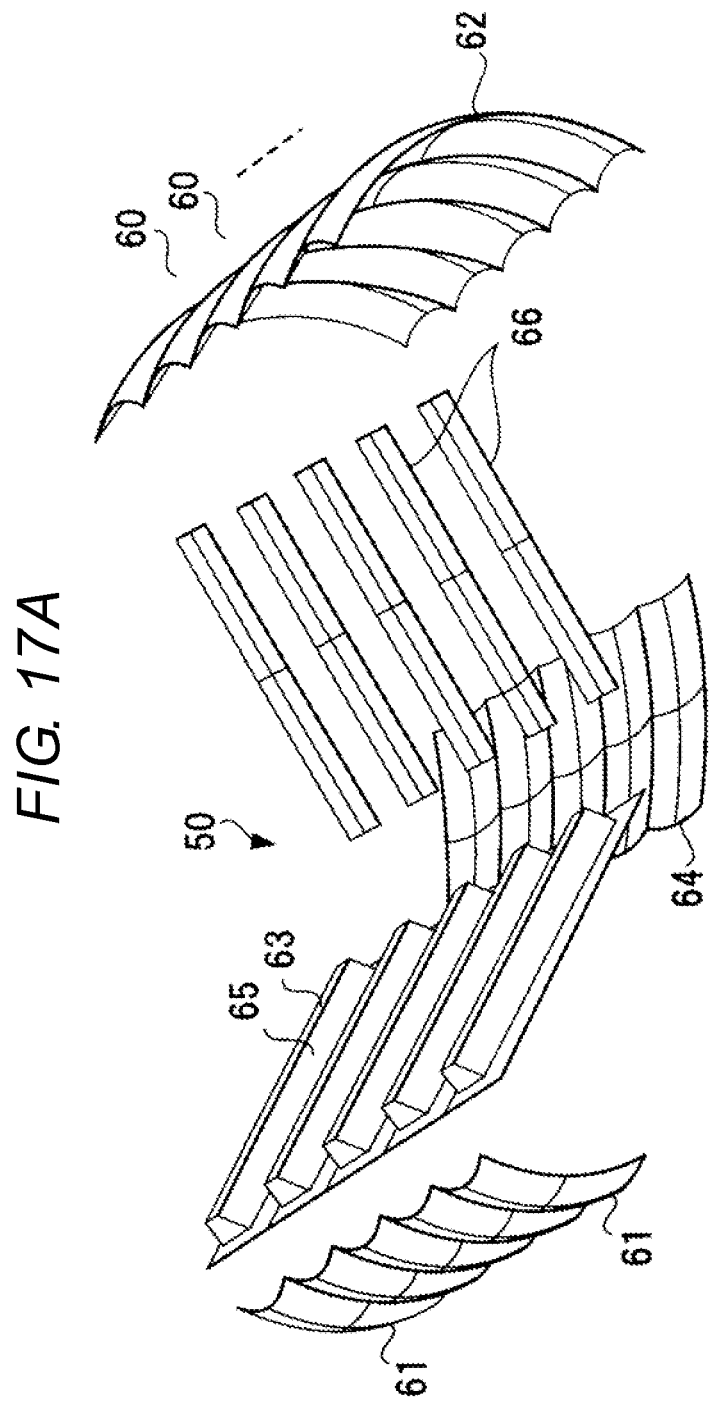
FIGS. 17A and 17B are diagrams illustrating an imaging element array according to a second embodiment.
Figure 17B:
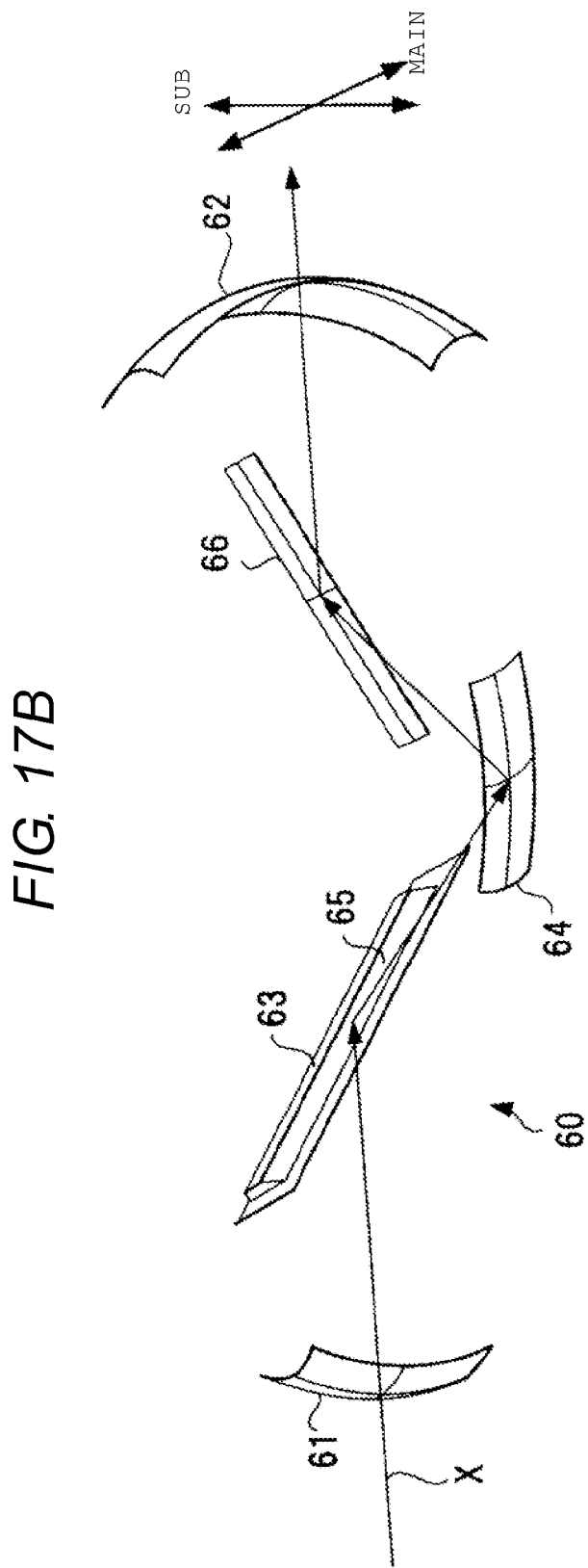

FIG. 17A is a diagram illustrating the imaging element array 50 according to the second embodiment. The imaging element array 50 according to the second embodiment includes plural imaging elements 60, and each imaging element 60 includes the lens surface 61 which is an incident surface, the lens surface 62 which is an emission surface, and mirror surfaces 63, 64, and 66 from which light rays entering from the lens surface 61 are reflected three times to the emission lens surface 62. FIG. 17B is a diagram illustrating one imaging element 60.

The mirror surface 63 is positioned at a position next to the lens surface 61 on the incident side and is a planar mirror which is formed on the top of a convex portion with side walls 65 which outwardly protrudes from the imaging element 60. The light rays X incident to the imaging element array 50 enter to the lens surface 61 (incident surface) and are collected in both the main-scanning direction and the sub-scanning direction. Among the light rays, light rays contributing to image formation enter to the mirror surface 63. All the light rays incident to the mirror surface 63 are reflected, and light rays contributing to image formation among the reflected light rays, i.e., those not further reflected or absorbed at side walls 65, are reflected to the mirror surface 64. The mirror surface 64 is in contact with other mirror surfaces 64 of adjacent imaging elements 60 at boundary surfaces (mirror edges).

All the light rays incident to the mirror surface 64 are reflected and reach the mirror surface 66. All the light rays incident to the mirror surface 66 are reflected, and light rays contributing to image formation among the reflected light rays are guided to the lens surface 62 (emission surface), are imaged again by the lens surface 62, and form an erect equal-magnification image on an image plane.

Figure 18A:
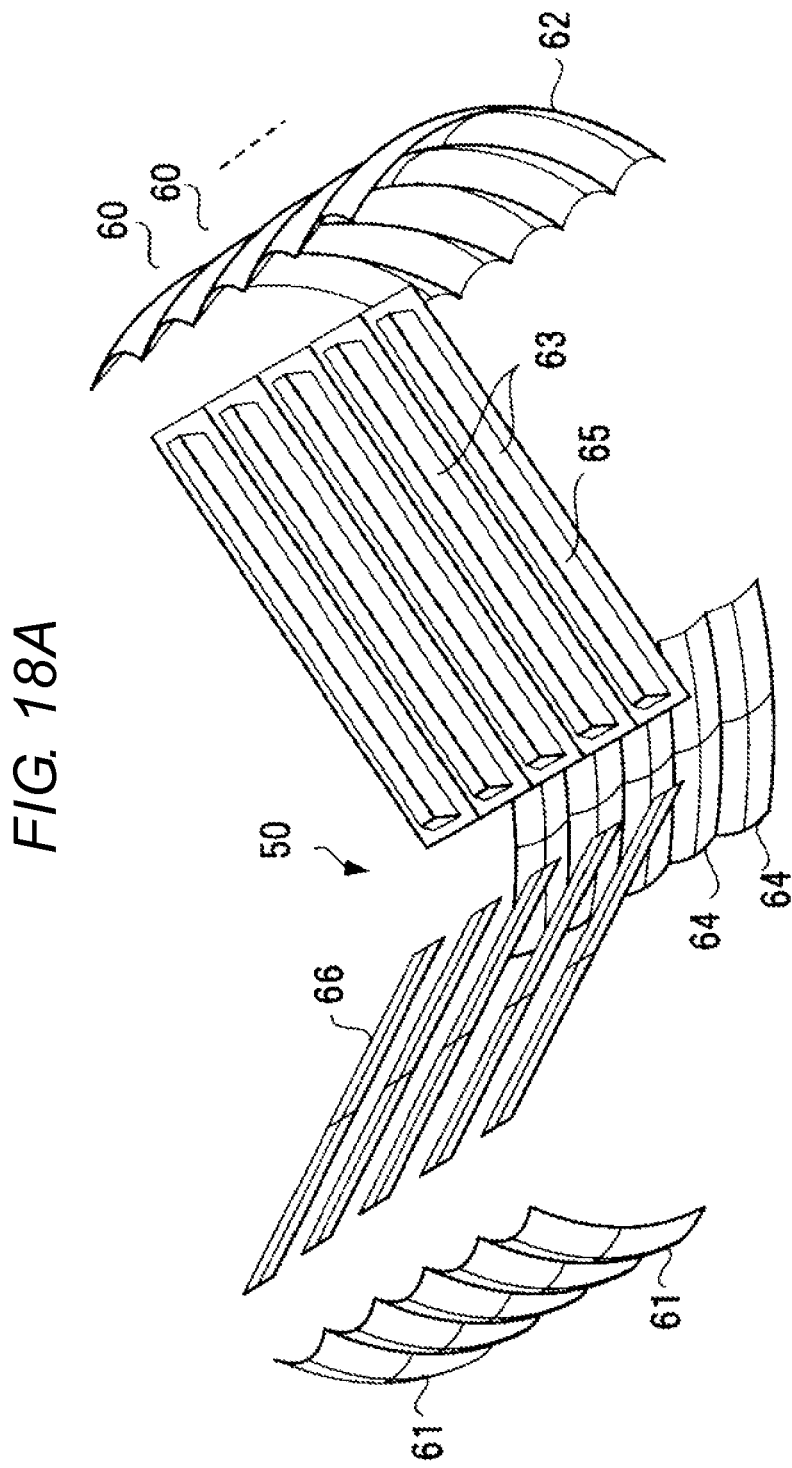
FIGS. 18A and 18B are diagrams illustrating a configuration of a modification example of the imaging element array according to the second embodiment.
Figure 18B:
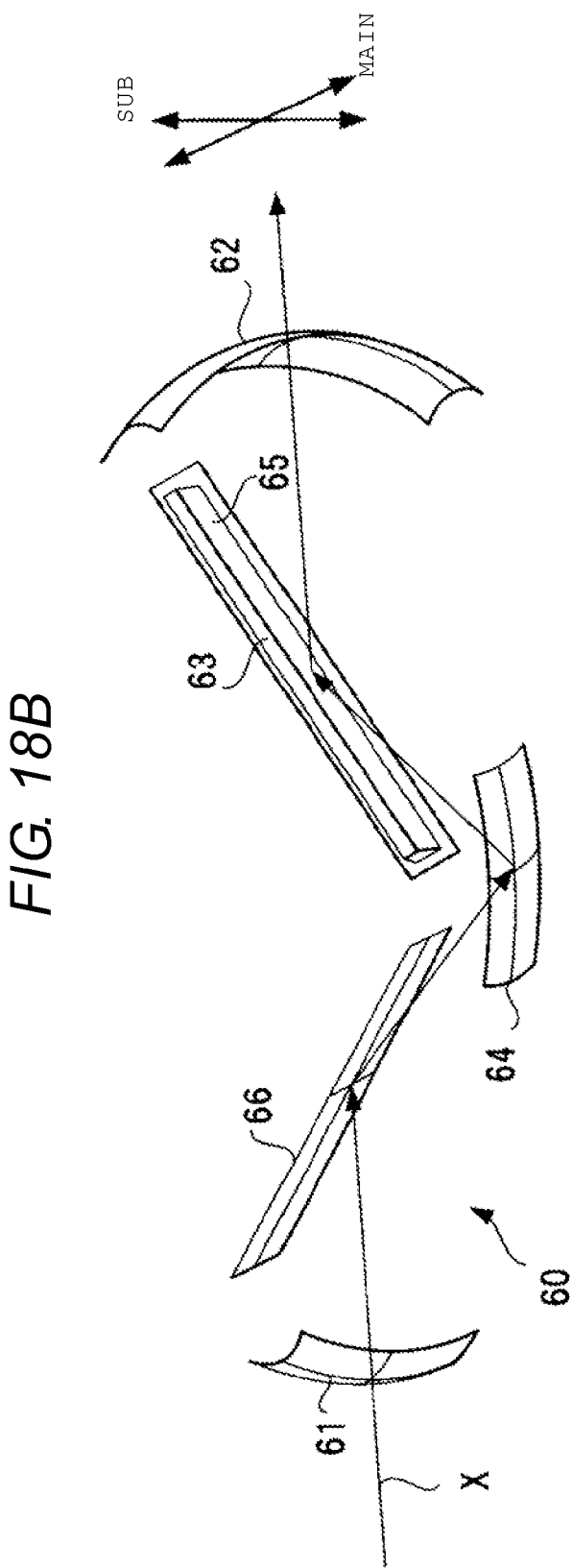

FIGS. 18A and 18B are diagrams illustrating an imaging element array according to a modification example of the second embodiment. The imaging element array 50 of FIG. 18A includes plural imaging elements 60. In each imaging element 60, a mirror surface 63 is arranged before an emission lens surface 62, a mirror surface 66 is arranged at a position next to a lens surface 61 on an incident side, and a mirror surface 64 is arranged between the mirror surface 66 and the mirror surface 63. FIG. 18B is a diagram illustrating one imaging element 60.

Figure 19A:
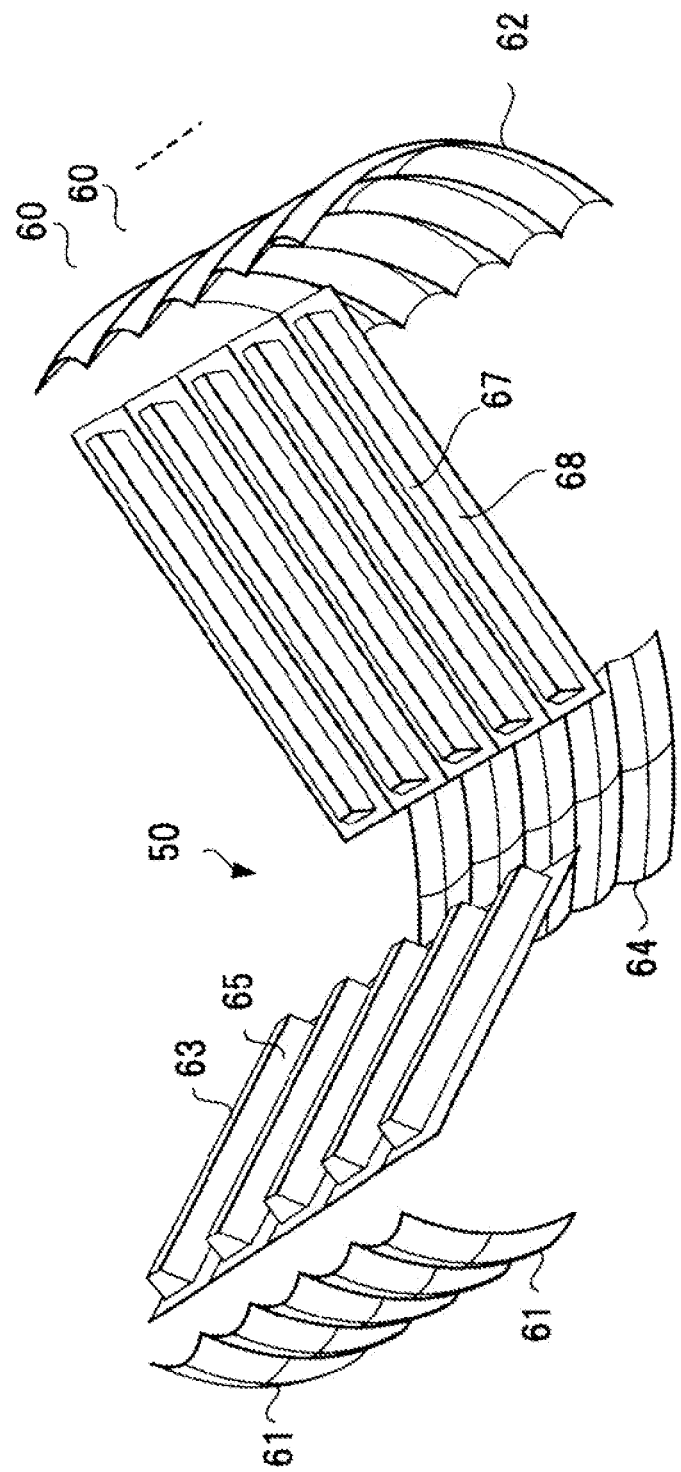
FIGS. 19A and 19B are diagrams illustrating a configuration of another modification example of the imaging element array according to the second embodiment.
Figure 19B:
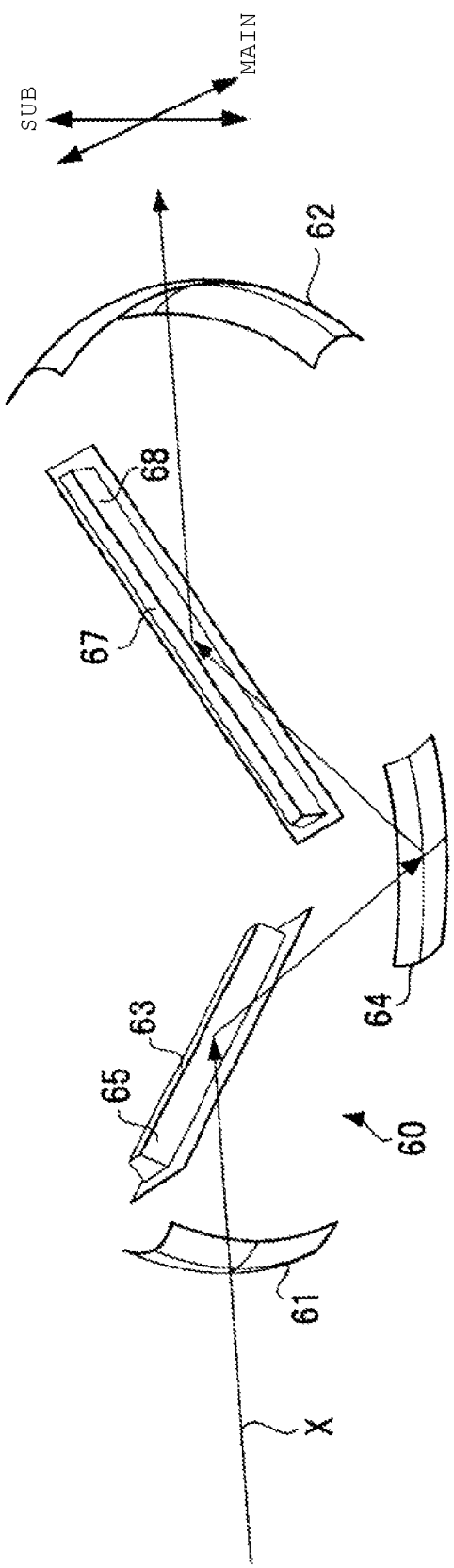

FIGS. 19A and 19B are diagrams illustrating an imaging element array according to another modification example of the second embodiment. The imaging element array 50 of FIG. 19A includes plural imaging elements 60. In each imaging element 60, a mirror surface 63 is arranged at a position next to a lens surface 61 on an incident side, a mirror surface 67 is arranged before an emission lens surface 62, and a mirror surface 64 is arranged between the mirror surface 63 and the mirror surface 67. FIG. 19B is a diagram illustrating one imaging element 60.

The mirror surface 63 is a planar mirror that is formed on the top of a convex portion having walls 65 which outwardly protrudes from the imaging element 60. In addition, the mirror surface 67 has the same configuration as that of the mirror surface 63 and is a planar mirror that is formed on the top of a convex portion with walls 68 which outwardly protrudes from the imaging element 60.

(Third Embodiment)

Figure 20A:
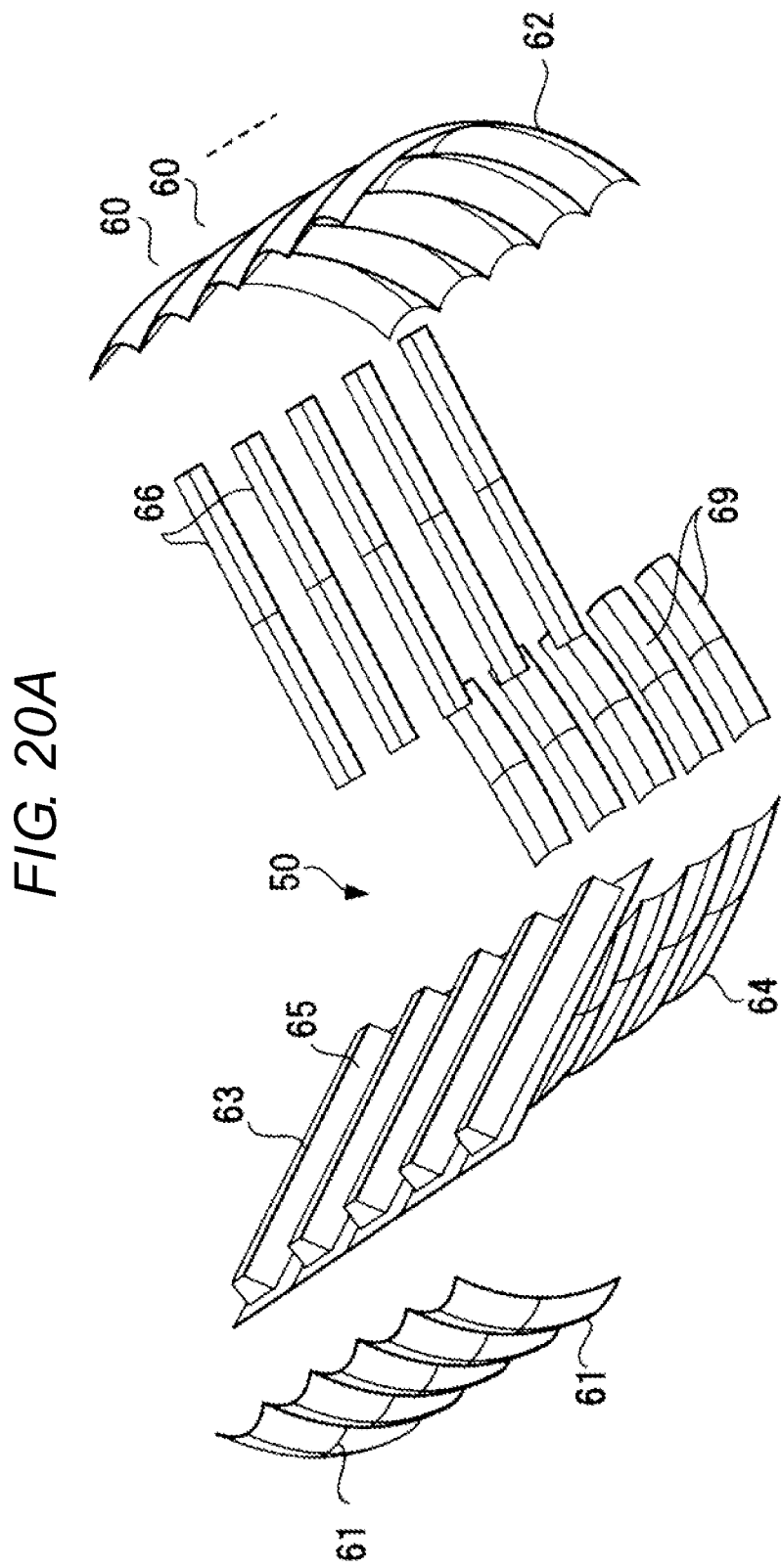
FIGS. 20A and 20B are diagrams illustrating an imaging element array according to a third embodiment.
Figure 20B:
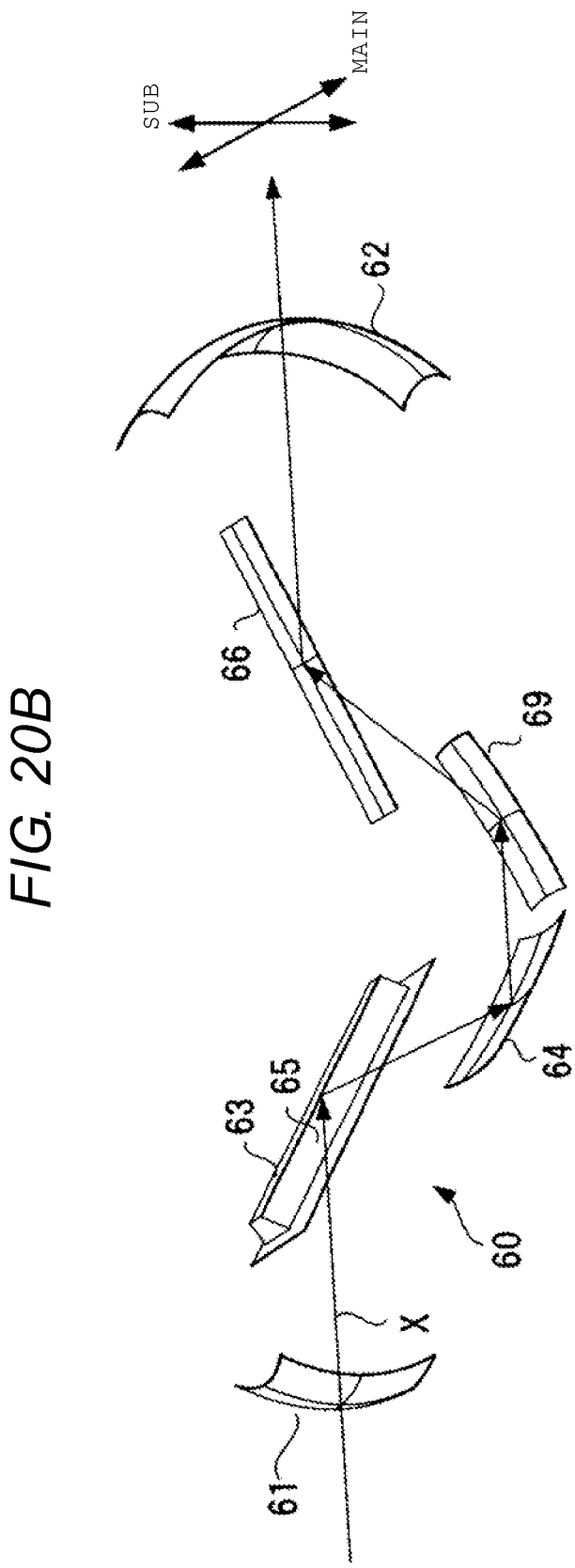

FIGS. 20A and 20B are diagrams illustrating an imaging element array 50 according to a third embodiment. The imaging element array 50 according to the third embodiment reflects light rays entering from the incident lens surface 61 multiple times (four times) to be guided to the emission lens surface 62.

As illustrated in FIG. 20A, the imaging element array 50 according to the third embodiment is obtained by combining plural imaging elements 60. In each imaging element 60, a mirror surface 63 having a convex portion with walls 65 is arranged at a position next to the incident lens surface 61, a mirror surface 66 is arranged before an emission lens surface 62, and a mirror surface 64 and a mirror surface 69 are arranged between the mirror surface 63 and the mirror surface 66.

That is, as illustrated in FIG. 20B, light rays X incident to the imaging element 60 enter to the lens surface 61 (incident surface) and are collected in both the main-scanning direction and the sub-scanning direction. Among the collected light rays, light rays contributing to image formation reach the mirror surface 63. The mirror surface 63 is formed on the top of the walls 65 of the convex portion which outwardly protrudes from the imaging element 60, and all the light rays incident to the mirror surface 63 are reflected. Among the reflected light rays, light rays contributing to image formation enter to the mirror surface 64 and those reflected by mirror surface 63 to walls 65 are reflected away from the mirror surface 64 and/or absorbed.

The mirror surface 64 is in contact with other mirror surfaces 64 of adjacent imaging elements 60 at boundary surfaces (mirror edges). Light rays incident to the mirror surface 64 are reflected. Among the reflected light rays, light rays contributing to image formation form an inverted image and then enter to the mirror surface 69. Further, light rays incident to the mirror surface 69 are reflected. Among the reflected light rays, light rays contributing to image formation reach the mirror surface 66. Among the light rays incident to the mirror surface 66, light rays contributing to image formation are guided to the lens surface 62 (emission surface), are imaged again by the lens surface 62, and form an erect equal-magnification image on an image plane.

An angle of light rays, which pass through only the incident lens surface 61, with respect to the main-scanning direction is monotonously increased by increasing a distance of the main-scanning direction from an object plane. Therefore, by arranging the mirror surface 63 having the convex portion with walls 65 immediately after the incident lens surface 61, unnecessary light rays can be shielded immediately after the incident lens surface 61. In addition, since unnecessary light rays are shielded on the upstream side, a shape of a light shielding portion (propagation preventing surface) which is provided between mirrors on the downstream side can be simplified, and a shape of a mold used to manufacture imaging element 60 during the molding of the array 50 can be simplified.

However, if stray light rays are shown on the downstream side of the mirror surface 63, it is hard to shield all the stray light rays having a great angle. Therefore, it is necessary that edges of the mirror surface 64 be formed in a sharp shape.

Figure 21A:
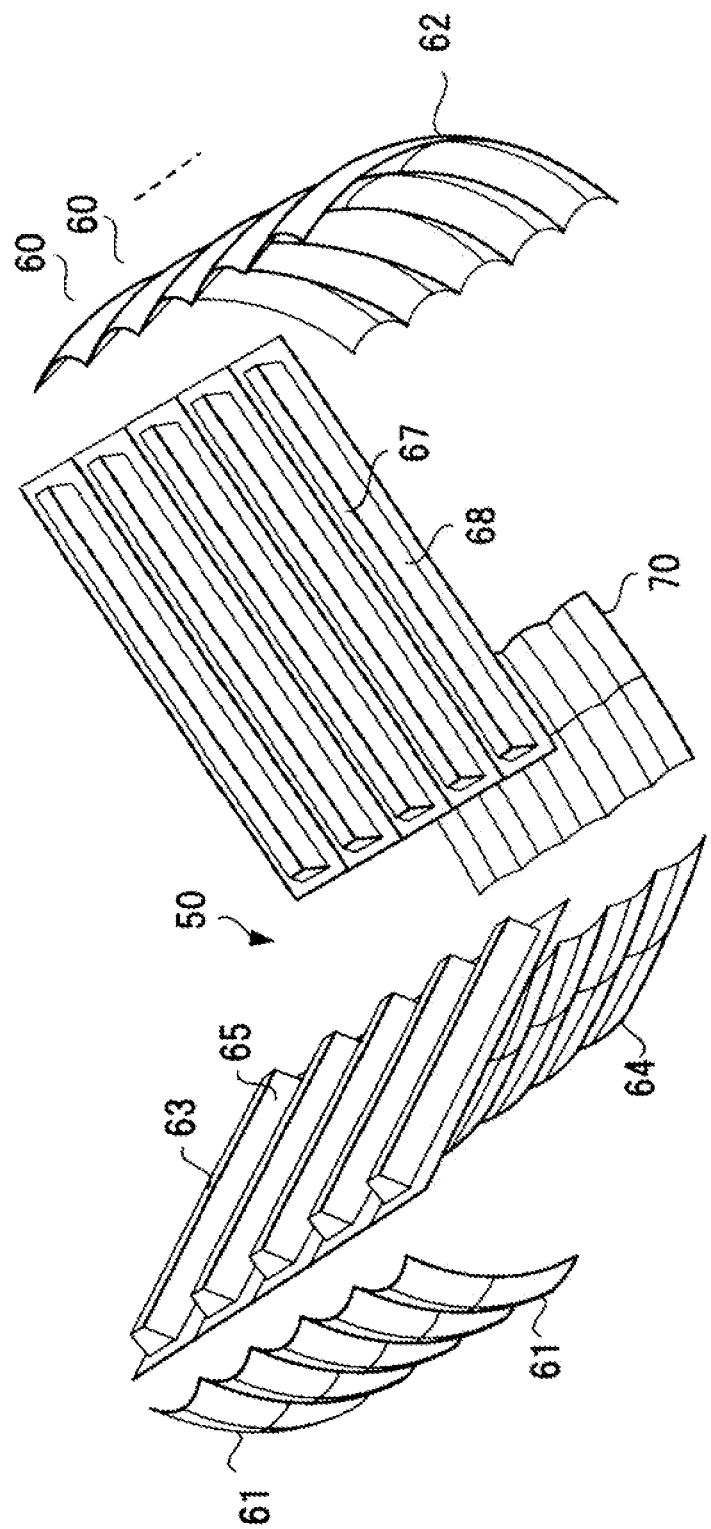

FIGS. 21A and 21B are diagrams illustrating an imaging element array according to a modification example of the third embodiment. In this example, as illustrated in FIGS. 21A and 21B, a mirror surface 63 having a convex portion with upstanding walls 65 is arranged at a position next to a lens surface 61 on an incident side, a mirror surface 67 having a convex portion having upstanding walls 68 is arranged before a lens surface 62 on an emission side, and a mirror surface 64 and a mirror surface 70 are arranged between the mirror surface 63 and the mirror surface 67. The mirror surface 70 is in contact with other mirror surfaces 70 of adjacent imaging elements 60 at boundary surfaces (mirror edges).

Unnecessary light rays can be shielded by the mirror surface 63 immediately after the incident lens surface 61. In addition, since stray light rays can be shielded by the mirror surface 67 before the emission lens surface 62, stray light rays can be prevented from entering to an image plane.

(Fourth Embodiment)

Next, an imaging element array according to a fourth embodiment will be described. The imaging element array 50 according to the fourth embodiment illustrated in FIGS. 22A and 22B includes an incident surface 81 and an emission surface 82, which are planar surfaces, and reflects light rays incident to the incident surface 81 multiple times (six times) to be guided to the emission surface 82.

Figure 22B:
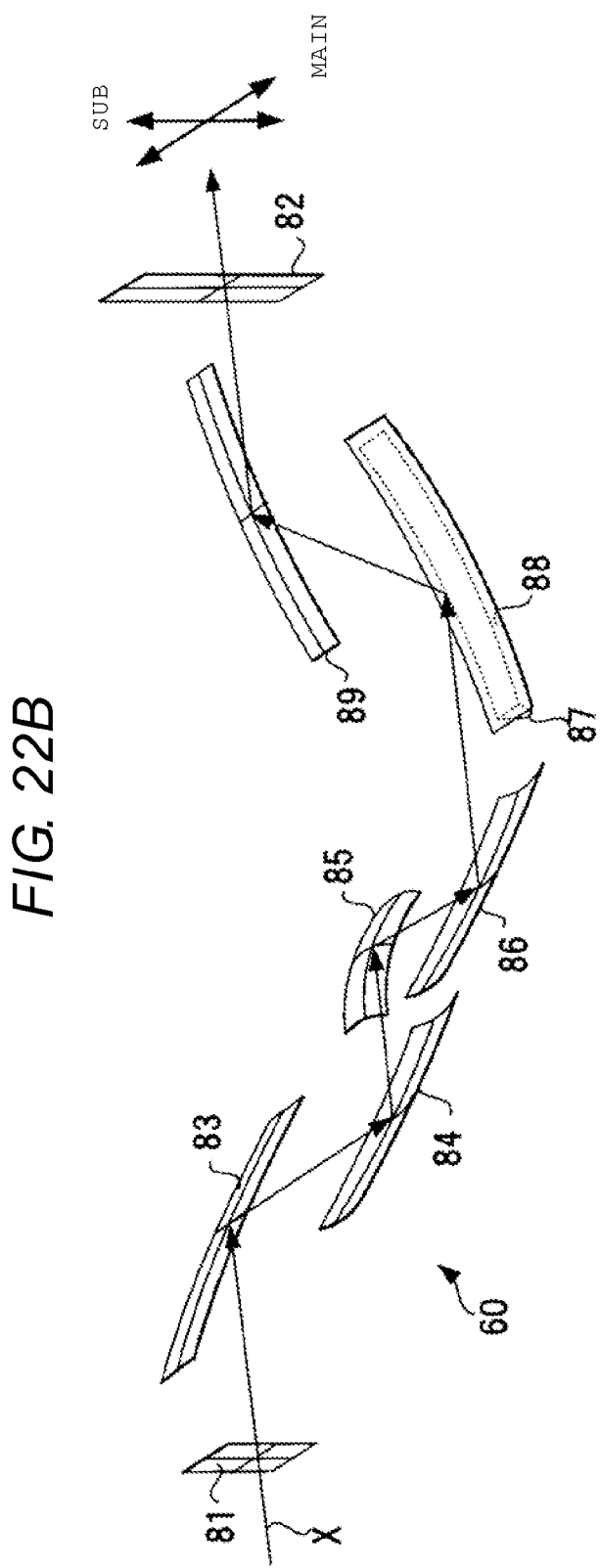

The imaging element array 50 of FIG. 22A includes plural imaging elements 60, and each imaging element 60 includes an incident surface 81, an emission surface 82, and mirror surfaces 83, 84, 85, 86, 87, 89 from which light rays incident to the incident surface 81 are reflected six times to be guided to the emission surface 82. FIG. 22B is a diagram illustrating one imaging element 60.

The mirror surface 83 has a power capable of collecting light rays in both the main-scanning direction and the sub-scanning direction and has the same function as that of the lens surface 61 on the incident side according to the above-described embodiments. In addition, the mirror surface 89 has a power capable of collecting light rays in both the main-scanning direction and the sub-scanning direction, is a mirror surface which is asymmetric in a direction perpendicular to the main-scanning direction, and has the same function as that of the lens surface 62 on the emission side.

Edges of the incident surface 81 and the emission surface 82 match with boundaries with adjacent mirror sets. In addition, there are four mirror surfaces 84, 85, 86, and 87 between the mirror surface 83 and the mirror surface 89. The mirror surface 85 is in contact with other mirror surfaces 85 of adjacent imaging elements 60 at boundary surfaces (mirror edges).

The mirror surfaces 84 to 86 have a shape which is asymmetric in a direction perpendicular to the main-scanning direction. The mirror surface 87 which is arranged before the mirror surface 89 is formed on the top of the convex portion 88 which outwardly protrudes. The mirror surface 87 is a free-form surface mirror having a shape which is asymmetric in a direction perpendicular to the main-scanning direction.

At least one of the mirror surface 84 which is arranged next to the mirror surface 83 and the mirror surface 87 which is arranged before the mirror surface 89 is formed on the top of a convex portion which outwardly protrudes. This mirror surface is a free-form surface mirror or a planar mirror having a shape which is asymmetric in a direction perpendicular to the main-scanning direction.

In all the embodiments, depending on the requirements, some of the mirror surfaces can have a shape which is symmetric in a direction perpendicular to the main-scanning direction or a planar surface. In addition, a configuration may be adopted in which the propagation preventing surfaces are not provided between some adjacent mirror surfaces and the mirror surfaces are in contact with each other.

In the embodiments, components having the same name are represented by the same reference numeral. However, the components having the same reference numeral do not necessarily have the same shape. For example, both the incident lens surface of FIG. 6 and the incident lens surface of FIG. 20 have the same reference numeral 61, but shapes thereof are different from each other. Likewise, the emission mirror surface 66 of FIGS. 17A and 17B and the incidence mirror surface 66 of FIGS. 18A and 18B; and the mirror surface 64 of FIG. 6 and the mirror surface 64 of FIGS. 17A and 17B have the same reference numeral, respectively, but shapes thereof are different from each other.

In the imaging element arrays according to the above-described embodiments, a mirror surface in the vicinity of a position where an inverted image is formed is in contact with adjacent mirror surfaces without a light shielding portion interposed therebetween and has a configuration capable of increasing an optical efficiency. In addition, an erect equal-magnification optical system having a high optical efficiency can be provided at a low cost. Accordingly, a high-quality image can be formed by applying the imaging element arrays according to the above-described embodiments to an image forming apparatus.

In addition, since an array can be formed of one molded product, a deviation in relative position between a lens and a mirror can be suppressed. Further, since an aspect ratio (height/width) of the convex portion for shielding light is low, molding and preparation of a mold is simple, and a molding cycle time can be reduced.

In addition, in the first embodiment, since the number of lens surfaces and the number of mirror surfaces are only two, respectively, the number of mirror surfaces that have a large effect on imaging characteristics is small. Further, a diameter of a light flux is small on a surface having a power, and a mirror having a large diameter of a light flux is configured to have no power. Therefore, since allowable values for a position of a mirror surface and for an angle deviation are great, an optical system can be easily manufactured.

In the description of the above-described embodiments, the image forming apparatus is an MFP but is not limited thereto. Cases where the image forming apparatus is a single scanner as an image reading device and cases where the image forming apparatus is a single electrophotographic printer as an optical scanning device are also included in the category of the image forming apparatus according to the embodiments.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An imaging element array comprising:
a plurality of imaging elements that are arranged side by side,
wherein each imaging element is integrally molded as a single piece element and includes an incident surface, an emission surface, and a plurality of reflective surfaces which are provided between the incident surface and the emission surface,
the imaging element has a first reflective element and propagation preventing surfaces,
the first reflective element comprises at least one of the plurality of reflective surfaces and has an effective region which is in contact with adjacent imaging elements, and
the propagation preventing surfaces are positioned to either side of another one of the plurality of reflective surfaces and are positioned to prevent light rays other than light rays reflected from the reflective surface from propagating to the emission surface.

2. The array according to claim 1, wherein the first reflective element is arranged in the vicinity of a position in the imaging element where an inverted image is formed.

3. The array according to claim 2, wherein the first reflective element has a power capable of reflecting the inverted image which impinges thereon and allowing the vicinity of the incident surface and the vicinity of the emission surface to be in a conjugate relationship with each other.

4. The array according to claim 1, wherein the another one of the plurality of reflective surfaces of the imaging element is formed on a convex portion of the imaging element which protrudes therefrom with wall surfaces on opposed sides thereof, wherein the wall surfaces of the convex portion function as the propagation preventing surfaces.

5. The array according to claim 4, wherein the wall surfaces are coated with a light absorbent material.

6. The array according to claim 4, wherein the wall surfaces are positioned to reflect light received thereagainst to a direction other than a direction ultimately resulting in emission from the emission surface.

7. The array according to claim 6, wherein the wall surfaces are positioned to reflect light received thereagainst to an internal surface of the imaging element other than a mirror surface or emission surface thereof.

8. The array according to claim 4, wherein the wall surfaces are positioned to reflect a portion of the light reflected from the another one of the plurality of reflective surfaces.

9. The array according to claim 1, wherein the imaging elements are molded in a single mold.

10. The array according to claim 1, wherein the first reflective element is positioned in the light path through the imaging element between the another one of the plurality of reflective surfaces and the incident surface.

11. The array according to claim 1, wherein the first element surface is positioned in the light path through the imaging element between the another one of the plurality of reflective surfaces and the emission surface.

12. A method of transmitting light from a light image through an imaging element to form an image at an image plane, comprising the steps of;
receiving light of the light image at an incident lens and passing the light therefrom to a first mirror;
reflecting a reversed image of the light from the first mirror to a second mirror; and
reflecting the light image to an emission lens, wherein:
light entering the incident lens which is not directly received from the light image is directed to a location other than one which will result in the light entering the incident lens which is not directly received from the light image reaching the image plane.

13. The method of claim 12, wherein the light entering the incident lens which is not directly received from the light image is directed to a light absorbent.

14. The method of claim 12, wherein the light entering the incident lens which is not directly received from the light image is directed to a third mirror, other than the first or second mirrors, from which it is reflected to a location where it does not reach the image plane.

15. The method of claim 14, wherein the third mirror, other than the first or second mirrors, is located directly adjacent to one of the first and second mirrors, and a portion of the light reflected at the one of the first and second mirrors adjacent to the third mirror, which is light which was not directly received from the light image, is further reflected by the third mirror to a location where it does not reach the image plane.

16. The method of claim 12, wherein the second mirror surface has a power capable of reflecting the inverted image therefrom such that the incident surface and the emission surface to have a conjugate relationship with each other.

17. An image forming apparatus comprising:
an illumination device that emits light;
a plurality of imaging elements that are arranged side by side in a row;
wherein each imaging element is integrally molded as a single piece element and includes an incident surface into which the light emitted from the illumination device enters the imaging element, an emission surface, and a plurality of reflective surfaces which are provided between the incident surface and the emission surface;
a focal plane at which light passing through the imaging elements is focused after passing through the emission surface;
the imaging element has a first reflective element and propagation preventing surfaces;
the first reflective element comprises at least one of the plurality of reflective surfaces and has an effective region which is in contact with adjacent imaging elements, and
the propagation preventing surfaces are positioned to either side of another one of the plurality of reflective surfaces and are positioned to prevent light rays other than light rays reflected from the reflective surface from propagating to the emission surface.

18. The imaging apparatus of claim 17, wherein the incident surface is a lens which is asymmetric in the direction perpendicular to the row of imaging elements.

19. The imaging apparatus of claim 18, wherein the emission surface is a lens which is asymmetric in the direction perpendicular to the row of imaging elements.

20. The imaging apparatus of claim 19, wherein the first reflective element is arranged in the vicinity of a position in the imaging element where an inverted image is formed.

* * * * *